(12) United States Patent
Wang et al.

(10) Patent No.: US 12,170,989 B2
(45) Date of Patent: Dec. 17, 2024

(54) SIGNAL SHAPING WITH CANCELED TONES

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/645,262

(22) Filed: Dec. 20, 2021

(65) Prior Publication Data

US 2023/0199737 A1    Jun. 22, 2023

(51) Int. Cl.
*H04M 3/00*       (2024.01)
*H04L 12/66*      (2006.01)
*H04M 5/00*       (2006.01)
*H04W 72/0453*    (2023.01)

(52) U.S. Cl.
CPC .............................. *H04W 72/0453* (2013.01)

(58) Field of Classification Search
CPC . H04W 72/02; H04W 72/0446; H04W 92/18; H04W 72/0453; H04W 28/16; H04W 52/18; H04W 52/54; H04W 52/58; H04W 72/044; H04W 72/20; H04W 72/23; H04W 72/51; H04W 72/541; H04W 72/25; H04W 72/12; H04W 8/22; H04L 5/0094; H04L 5/001; H04L 5/0044; H04L 1/1671; H04L 25/0204; H04L 5/0007; H04J 11/004
See application file for complete search history.

(56) References Cited

U.S. PATENT DOCUMENTS 9,780,985 B1 * 10/2017 Tom ..................... H04L 5/0007
11,152,966 B1 * 10/2021 Oyman ................. H04J 11/004
(Continued)

FOREIGN PATENT DOCUMENTS

WO    WO-2021109463 A1    6/2021
WO    WO-2023283193       1/2023

OTHER PUBLICATIONS

Schmidt Jorge F et al, Choose Your Subcarriers Wisely: Active Interference Cancellation for Cognitive OFDM, IEEE Journal on Emerging and Selected Topics in Circuits and Systems, vol. 3, No. 4, Dec. 1, 2013, pp. 612-625 (Year: 2013).*

(Continued)

*Primary Examiner* — Kharye Pope
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a cancellation indication that indicates a set of resources in which to cancel an uplink or sidelink communication. The UE may transmit a combined signal including a data signal and a cancellation signal. The UE, to transmit the combined signal, may transmit the data signal on one or more subcarriers other than subcarriers included in the set of resources indicated by the cancellation indication, and transmit the cancellation signal on a set of cancellation subcarriers for performing signal shaping of the data signal. Numerous other aspects are described.

30 Claims, 16 Drawing Sheets

(56) References Cited

U.S. PATENT DOCUMENTS

| | | | | |
|---|---|---|---|---|
| 2009/0088092 | A1* | 4/2009 | Wang | H04B 1/71 455/114.2 |
| 2012/0230449 | A1* | 9/2012 | Futatsugi | H04J 11/003 375/296 |
| 2019/0273598 | A1* | 9/2019 | Ibrahim | H04L 25/08 |
| 2021/0029688 | A1* | 1/2021 | Zhang | H04W 72/0446 |
| 2021/0219276 | A1* | 7/2021 | Liu | H04L 5/0094 |
| 2021/0345360 | A1* | 11/2021 | Yeo | H04W 72/20 |
| 2022/0361235 | A1* | 11/2022 | Liu | H04W 72/1263 |

OTHER PUBLICATIONS

Luca Sanguinetti et al , On the Performance of Cancellation Carrier-Based Schemes for Sidelobe Suppression in OFDM Networks, Vehicular Technology Conference, 2008, VTC Spring 2008, May 11, 2008, pp. 1691-1696, col. 5, Section IV (Year: 2008).*
International Search Report and Written Opinion—PCT/US2022/080237—ISA/EPO—Mar. 24, 2023.
Sanguinetti L., et al., "On the Performance of Cancellation Carrier-Based Schemes for Sidelobe Suppression in OFDM Networks", VTC Spring 2008—IEEE Vehicular Technology Conference, Piscataway, NJ, USA, May 11, 2008, XP031255853, pp. 1691-1696, col. 5, section IV, first paragraph.
Schmidt J.F., "Choose Your Subcarriers Wisely: Active Interference Cancellation for Cognitive OFDM", IEEE Journal on Emerging and Selected Topics in Circuits and Systems, Piscataway, NJ, USA, vol. 3, No. 4, Dec. 1, 2013, XP011533544, pp. 615-625, col. 2, paragraph 1, col. 2, paragraph 3 col. 3, paragraph 2 col. 4, paragraph second last col. 13, paragraph 2 col. 15, paragraph second last.

* cited by examiner

SIGNAL SHAPING WITH CANCELED TONES

FIELD OF THE DISCLOSURE

Aspects of the present disclosure generally relate to wireless communication and to techniques and apparatuses for signal shaping with canceled tones.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive a cancellation indication that indicates a set of resources in which to cancel an uplink or sidelink communication. The one or more processors may be configured to transmit a combined signal including a data signal and a cancellation signal. The one or more processors, to transmit the combined signal may be configured to transmit the data signal on one or more subcarriers other than subcarriers included in the set of resources indicated by the cancellation indication, and transmit the cancellation signal on a set of cancellation subcarriers for performing signal shaping of the data signal.

Some aspects described herein relate to a wireless network device for wireless communication. The wireless network device may include a memory and one or more processors coupled to the memory. The one or more processors may be configured to receive, from a first UE, a combined signal including a cancellation signal, on a set of cancellation subcarriers, and a data signal. The one or more processors may be configured to discard symbols associated with the cancellation signal received on the set of cancellation subcarriers. The one or more processors may be configured to decode the data signal received on one or more subcarriers other than the set of cancellation sub carriers.

Some aspects described herein relate to a base station for wireless communication. The base station may include a memory and one or more processors coupled to the memory. The one or more processors may be configured to receive, from a UE, an indication of a UE capability for signal shaping. The one or more processors may be configured to transmit, to the UE, a cancellation indication that indicates a set of resources in which to cancel an uplink or sidelink communication, wherein the cancellation indication further indicates signal shaping information associated with the cancellation indication.

Some aspects described herein relate to a method of wireless communication performed by a UE. The method may include receiving a cancellation indication that indicates a set of resources in which to cancel an uplink or sidelink communication. The method may include transmitting a combined signal including a data signal and a cancellation signal. Transmitting the combined signal may include transmitting the data signal on one or more subcarriers other than subcarriers included in the set of resources indicated by the cancellation indication, and transmitting the cancellation signal on a set of cancellation subcarriers for performing signal shaping of the data signal.

Some aspects described herein relate to a method of wireless communication performed by a wireless network device. The method may include receiving, from a first UE, a combined signal including a cancellation signal, on a set of cancellation subcarriers, and a data signal. The method may include discarding symbols associated with the cancellation signal received on the set of cancellation subcarriers. The method may include decoding the data signal received on one or more subcarriers other than the set of cancellation subcarriers.

Some aspects described herein relate to a method of wireless communication performed by a base station. The method may include receiving, from a UE, an indication of a UE capability for signal shaping. The method may include transmitting, to the UE, a cancellation indication that indicates a set of resources in which to cancel an uplink or sidelink communication, wherein the cancellation indication further indicates signal shaping information associated with the cancellation indication.

Some aspects described herein relate to a non-transitory computer-readable medium that stores a set of instructions for wireless communication by a UE. The set of instructions, when executed by one or more processors of the UE, may cause the UE to receive a cancellation indication that indicates a set of resources in which to cancel an uplink or sidelink communication. The set of instructions, when executed by one or more processors of the UE, may cause the UE to transmit a combined signal including a data signal and a cancellation signal. The set of instructions, when executed by one or more processors of the UE, may cause the UE to transmit the data signal on one or more subcarriers other than subcarriers included in the set of resources indicated by the cancellation indication, and transmit the cancellation signal on a set of cancellation subcarriers for performing signal shaping of the data signal.

Some aspects described herein relate to a non-transitory computer-readable medium that stores a set of instructions for wireless communication by a wireless network device. The set of instructions, when executed by one or more processors of the wireless network device, may cause the wireless network device to receive, from a first UE, a combined signal including a cancellation signal, on a set of cancellation subcarriers, and a data signal. The set of instructions, when executed by one or more processors of the wireless network device, may cause the wireless network device to discard symbols associated with the cancellation signal received on the set of cancellation subcarriers. The set of instructions, when executed by one or more processors of the wireless network device, may cause the wireless network device to decode the data signal received on one or more subcarriers other than the set of cancellation subcarriers.

Some aspects described herein relate to a non-transitory computer-readable medium that stores a set of instructions for wireless communication by a base station. The set of instructions, when executed by one or more processors of the base station, may cause the base station to receive, from a UE, an indication of a UE capability for signal shaping. The set of instructions, when executed by one or more processors of the base station, may cause the base station to transmit, to the UE, a cancellation indication that indicates a set of resources in which to cancel an uplink or sidelink communication, wherein the cancellation indication further indicates signal shaping information associated with the cancellation indication.

Some aspects described herein relate to an apparatus for wireless communication. The apparatus may include means for receiving a cancellation indication that indicates a set of resources in which to cancel an uplink or sidelink communication. The apparatus may include means for transmitting a combined signal including a data signal and a cancellation signal. The means for transmitting the combined signal may include means for transmitting the data signal on one or more subcarriers other than subcarriers included in the set of resources indicated by the cancellation indication, and means for transmitting the cancellation signal on a set of cancellation subcarriers for performing signal shaping of the data signal.

Some aspects described herein relate to an apparatus for wireless communication. The apparatus may include means for receiving, from a UE, a combined signal including a cancellation signal, on a set of cancellation subcarriers, and a data signal. The apparatus may include means for discarding symbols associated with the cancellation signal received on the set of cancellation subcarriers. The apparatus may include means for decoding the data signal received on one or more subcarriers other than the set of cancellation subcarriers.

Some aspects described herein relate to an apparatus for wireless communication. The apparatus may include means for receiving, from a UE, an indication of a UE capability for signal shaping. The apparatus may include means for transmitting, to the UE, a cancellation indication that indicates a set of resources in which to cancel an uplink or sidelink communication, wherein the cancellation indication further indicates signal shaping information associated with the cancellation indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
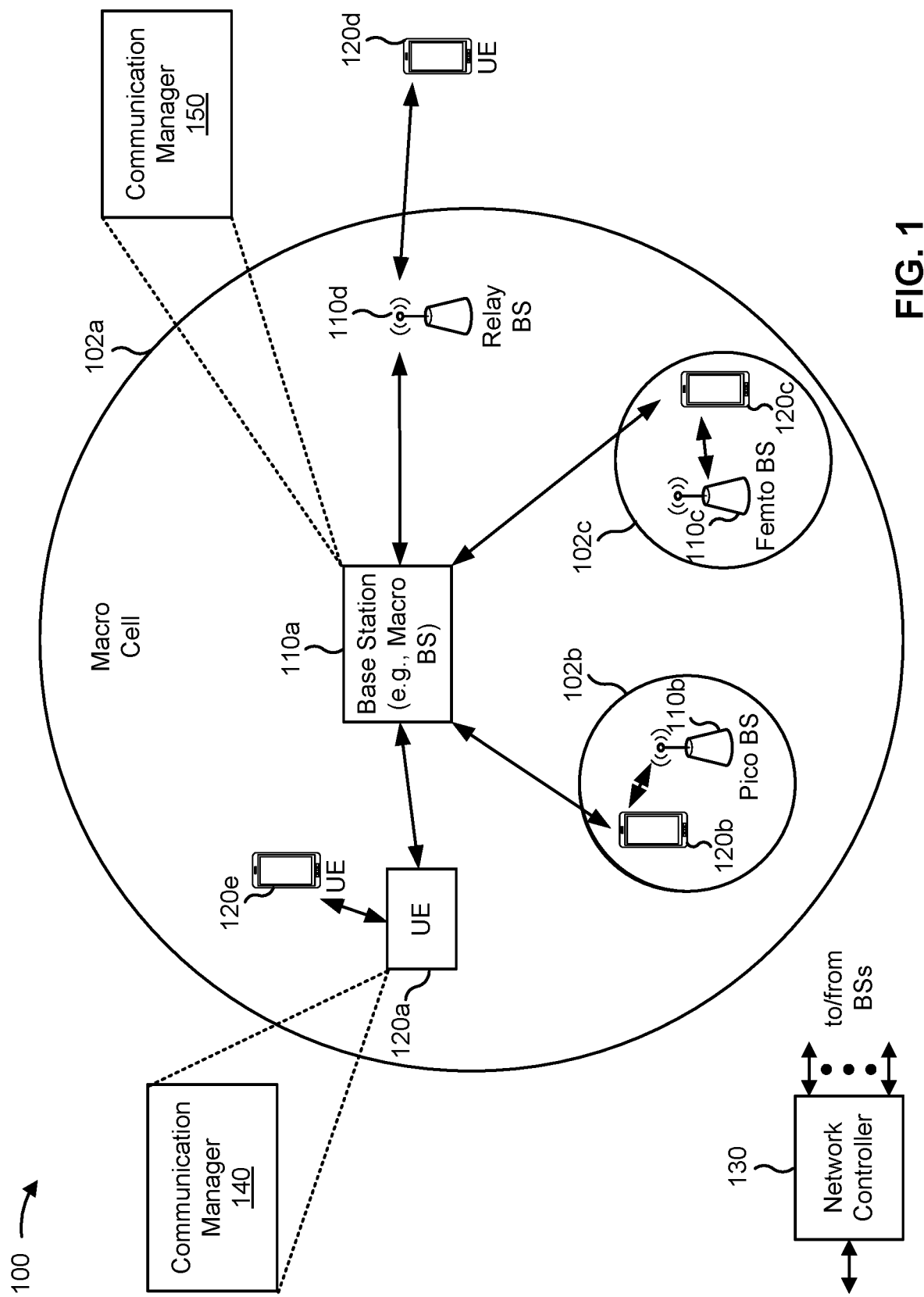
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a cancellation indication that indicates a set of resources in which to cancel an uplink or sidelink communication; and transmit a combined signal including a data signal and a cancellation signal. The communication manager 140, to transmit the combined signal, may transmit the data signal on one or more subcarriers other than subcarriers included in the set of resources indicated by the cancellation indication, and transmit the cancellation signal on a set of cancellation subcarriers for performing signal shaping of the data signal. Additionally, or alternatively, the communication manager 140 may perform one or more other operations described herein.

In some aspects, as described in more detail elsewhere herein, the communication manager 140 may receive, from another UE, a combined signal including a cancellation signal, on a set of cancellation subcarriers, and a data signal; discard symbols associated with the cancellation signal received on the set of cancellation subcarriers; and decode the data signal received on one or more subcarriers other than the set of cancellation subcarriers. Additionally, or alternatively, the communication manager 140 may perform one or more other operations described herein.

In some aspects, the base station 110 may include a communication manager 150. As described in more detail elsewhere herein, the communication manager 150 may receive, from a UE, a combined signal including a cancellation signal, on a set of cancellation subcarriers, and a data signal; discard symbols associated with the cancellation signal received on the set of cancellation subcarriers; and decode the data signal received on one or more subcarriers other than the set of cancellation subcarriers. Additionally, or alternatively, the communication manager 150 may perform one or more other operations described herein In some aspects, as described in more detail elsewhere herein, the communication manager 150 may receive, from a UE, an indication of a UE capability for signal shaping; and transmit, to the UE, a cancellation indication that indicates a set of resources in which to cancel an uplink or sidelink communication, wherein the cancellation indication further indicates signal shaping information associated with the cancellation indication. Additionally, or alternatively, the communication manager 150 may perform one or more other operations described herein.

As indicated above, FIG. 1 is provided as an example. Other examples may differ from what is described with regard to FIG. 1.

Figure 2:
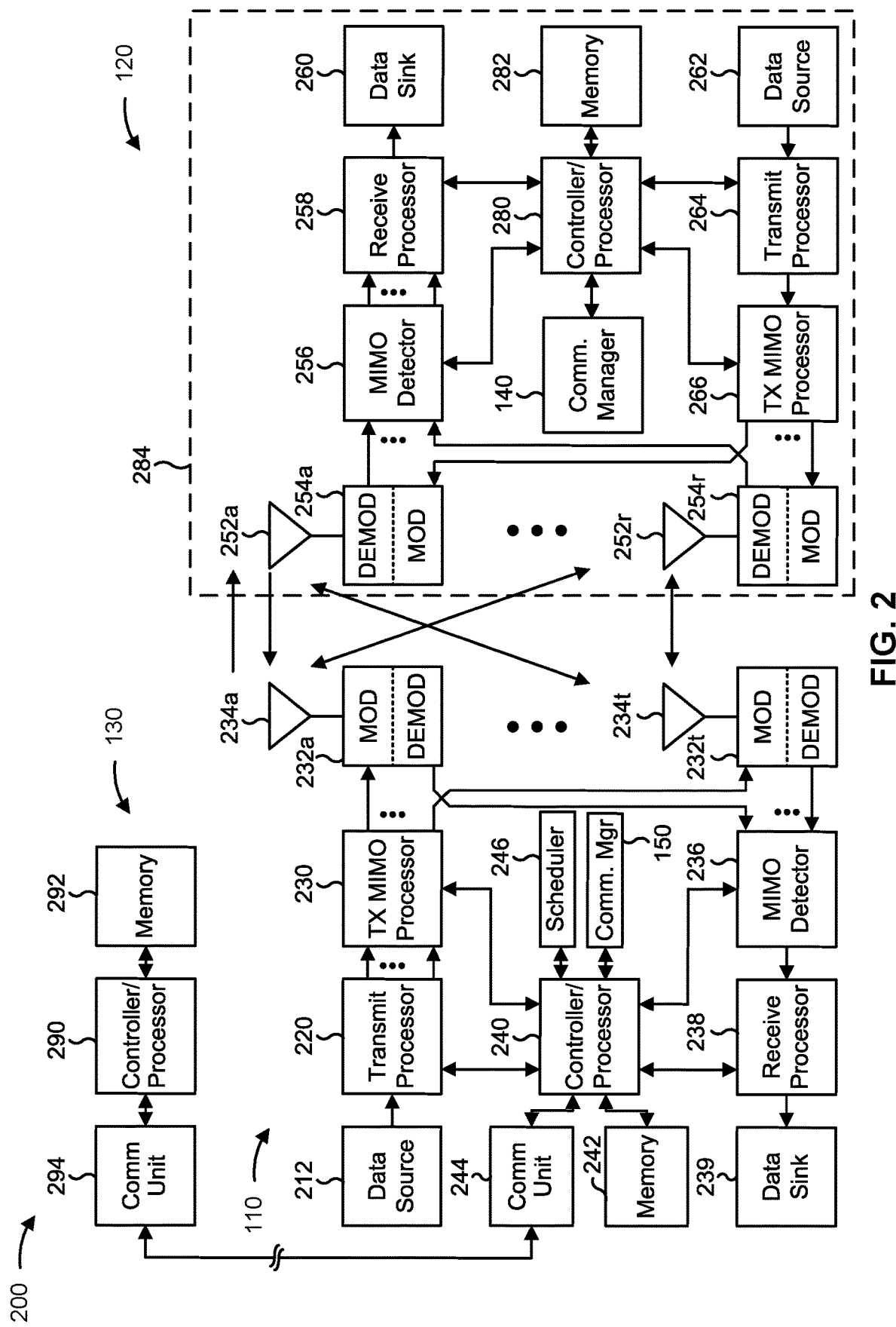
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-16).

The controller/processor 240 of the base station 110, the controller/processor 280 of the UE 120, and/or any other component(s) of FIG. 2 may perform one or more techniques associated with signal shaping with canceled tones, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples. In some aspects, the wireless network device described herein is the base station 110, is included in the base station 110, or includes one or more components of the base station 110 shown in FIG. 2. In some aspects, the wireless network device described herein is the UE 120, is included in the UE 120, or includes one or more components of the UE 120 shown in FIG. 2.

In some aspects, the UE 120 includes means for receiving a cancellation indication that indicates a set of resources in which to cancel an uplink or sidelink communication (e.g., using antenna 252, modem 254, MIMO detector 256, receive processor 258, controller/processor 280, memory 282, or the like); and/or means for transmitting a combined signal including a data signal and a cancellation signal (e.g., using controller/processor 280, transmit processor 264, TX MIMO processor 266, modem 254, antenna 252, memory 282, or the like). The means for transmitting the combined signal may include means for transmitting the data signal on one or more subcarriers other than subcarriers included in the set of resources indicated by the cancellation indication (e.g., using controller/processor 280, transmit processor 264, TX MIMO processor 266, modem 254, antenna 252, memory 282, or the like), and means for transmitting the cancellation signal on a set of cancellation subcarriers for performing signal shaping of the data signal (e.g., using controller/processor 280, transmit processor 264, TX MIMO processor 266, modem 254, antenna 252, memory 282, or the like). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the wireless network device includes means for receiving, from a UE, a combined signal including a cancellation signal, on a set of cancellation subcarriers, and a data signal (e.g., using antenna 234, modem 232, MIMO detector 236, receive processor 238, controller/processor 240, memory 242, antenna 252, modem 254, MIMO detector 256, receive processor 258, controller/processor 280, memory 282, or the like); means for discarding symbols associated with the cancellation signal received on the set of cancellation subcarriers (e.g., using controller/processor 240, memory 242, controller/processor 280, memory 282, or the like); and/or means for decoding the data signal received on one or more subcarriers other than the set of cancellation subcarriers (e.g., using controller/processor 240, memory 242, controller/processor 280, memory 282, or the like). In some aspects, the means for the wireless network device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless network device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving, from a UE, an indication of a UE capability for signal shaping (e.g., using antenna 234, modem 232, MIMO detector 236, receive processor 238, controller/processor 240, memory 242, or the like); and/or means for transmitting, to the UE, a cancellation indication that indicates a set of resources in which to cancel an uplink or sidelink communication, wherein the cancellation indication further indicates signal shaping information associated with the cancellation indication (e.g., using controller/processor 240, transmit processor 220, TX MIMO processor 230, modem 232, antenna 234, memory 242, or the like). The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
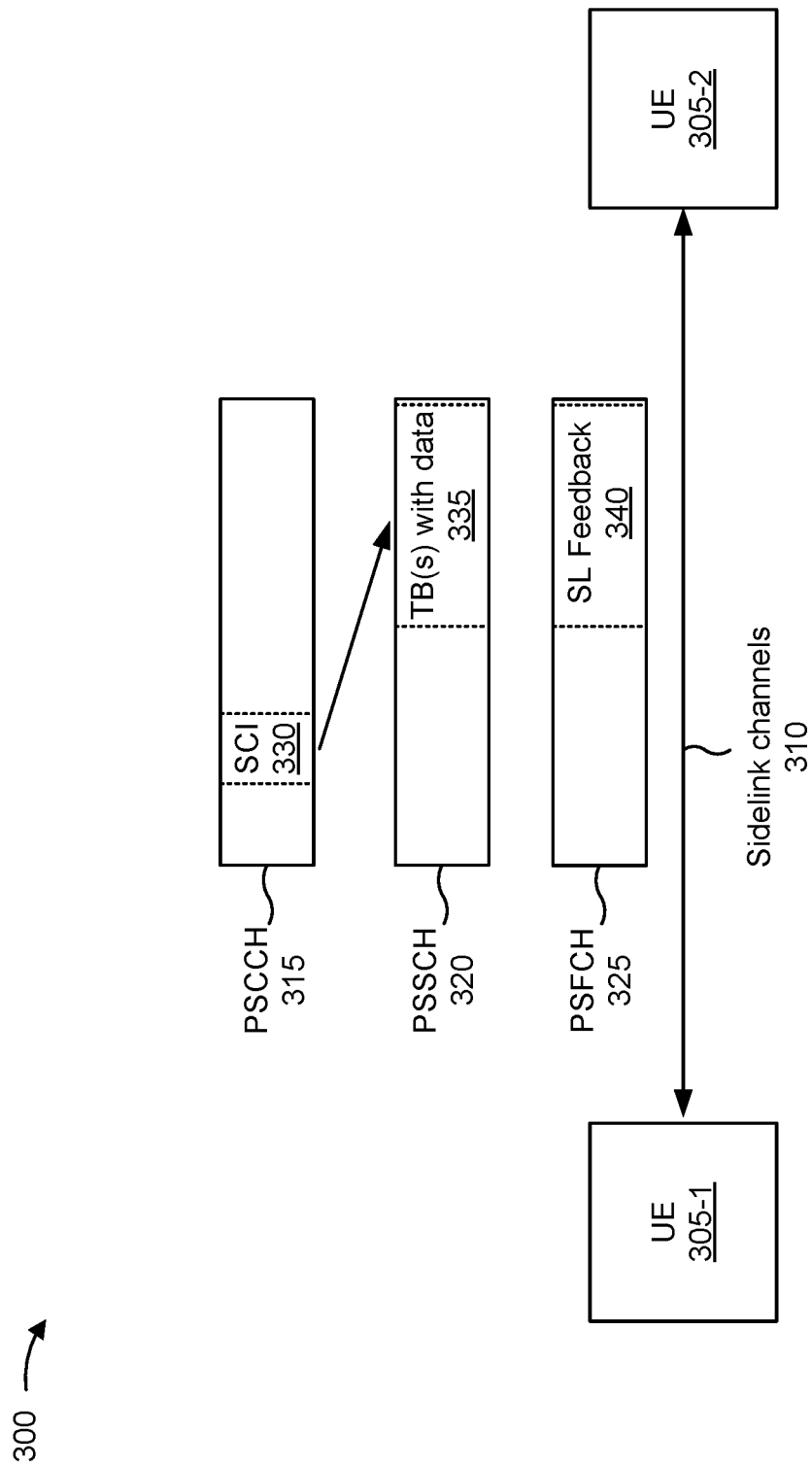
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some examples, the UEs 305 (e.g., UE 305-1 and/or UE 305-2) may correspond to one or more other UEs described elsewhere herein, such as UE 120. In some examples, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some examples, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some examples, the one or more sidelink channels 310 may use resource pools. For example, a scheduling assignment (e.g., included in SCI 330) may be transmitted in sub-channels using specific resource blocks (RBs) across time. In some examples, data transmissions (e.g., on the PSSCH 320) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 305 may operate in a resource allocation mode (e.g., Mode 1) in which a base station allocates resources for sidelink communications between UEs 305. In some examples, a UE 305 may operate using a resource allocation mode (e.g., Mode 2) in which resource selection and/or scheduling is autonomously performed by the UE 305 (e.g., rather than a base station 110). In some examples, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of RBs that the UE 305 can use for a particular set of subframes).

In the resource allocation mode where resource selection and/or scheduling is performed by a UE 305 (e.g., Mode 2), the UE 305 may generate sidelink grants, and may transmit the grants in SCI 330. A sidelink grant may indicate, for example, one or more parameters (e.g., transmission parameters) to be used for an upcoming sidelink transmission, such as one or more RBs to be used for the upcoming sidelink transmission on the PSSCH 320 (e.g., for TBs 335), one or more subframes to be used for the upcoming sidelink transmission, and/or an MCS to be used for the upcoming sidelink transmission. In some examples, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
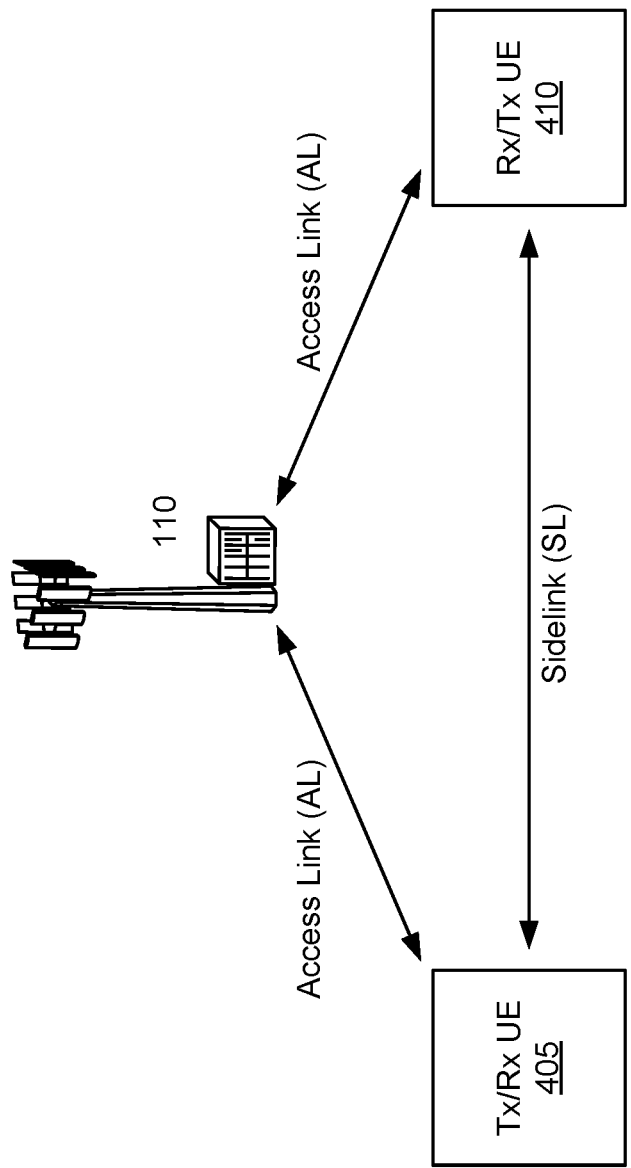
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
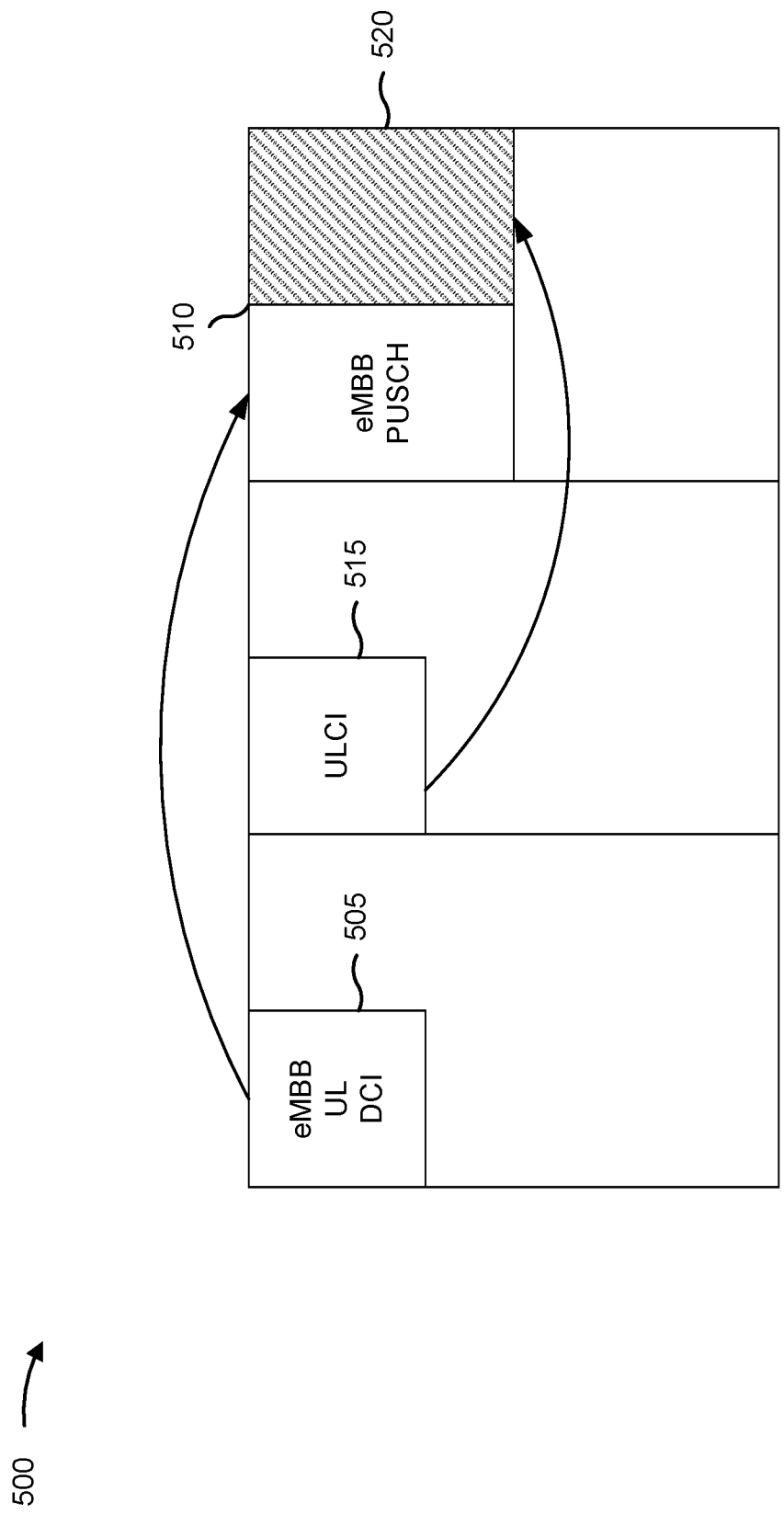
FIG. 5 is a diagram illustrating an example of an uplink cancellation indication (ULCI), in accordance with the present disclosure.

FIG. 5 is a diagram illustrating an example 500 of an uplink cancellation indication (ULCI), in accordance with the present disclosure.

A ULCI is an indication that cancels a previously scheduled resource for an uplink (e.g., PUSCH) transmission for a UE. The ULCI may be used to support uplink transmissions of traffic with different priorities (e.g., enhance mobile broadband (eMBB) traffic and ultra-reliable low-latency communication (URLLC) traffic) in a wireless network. For example, a base station may use a ULCI to preempt a scheduled PUSCH transmission by a low priority (e.g., eMBB) UE in a resource with a PUSCH transmission by a high priority (e.g., URLLC) UE. As a result, latency of high priority (e.g., URLLC) uplink traffic may be improved.

As shown in FIG. 5, a base station may transmit, to an eMBB UE, DCI 505 that includes an uplink grant for the eMBB UE. The DCI 505 may include scheduling information that schedules PUSCH resources 510 for a PUSCH communication by the eMBB UE. For example, the PUSCH 510 may include time and frequency resources (e.g., RBs) allocated for the eMBB UE to transmit the PUSCH communication to the base station. The base station, prior to the eMBB UE transmitting the PUSCH communication on the allocated PUSCH resources 510, may transmit a ULCI 515 to the eMBB UE. The ULCI may cancel one or more resources 520 of the allocated PUSCH resources 510 for the scheduled PUSCH communication by the eMBB UE. In some examples, the ULCI may be included in DCI format 2_4 (DCI 2_4). For example, the base station may transmit the ULCI to the eMBB UE in group common PDCCH (GC-PDCCH) DCI 2_4 using a cancellation indication radio network temporary identifier (CI-RNTI). The payload of the DCI 2_4 may indicate which time and frequency resources (e.g., which RBs) 520 are being canceled. The eMBB, in connection with receiving the ULCI 515, may cancel PUSCH communications scheduled on the resources 520 identified by the ULCI 515. The base station may then allocate the canceled resources for a PUSCH communication from a high priority (e.g., URLLC) UE.

A ULCI may only apply to resources allocated for PUSCH transmissions (e.g., including repetitions) and sounding reference signal (SRS) transmissions. In some examples, such as in a case in which an uplinkCancellation-Priority parameter is provided, a ULCI may only cancel low priority (e.g., eMBB) PUSCH transmissions.

As indicated above, FIG. 5 is provided as an example. Other examples may differ from what is described with respect to FIG. 5.

Figure 6:
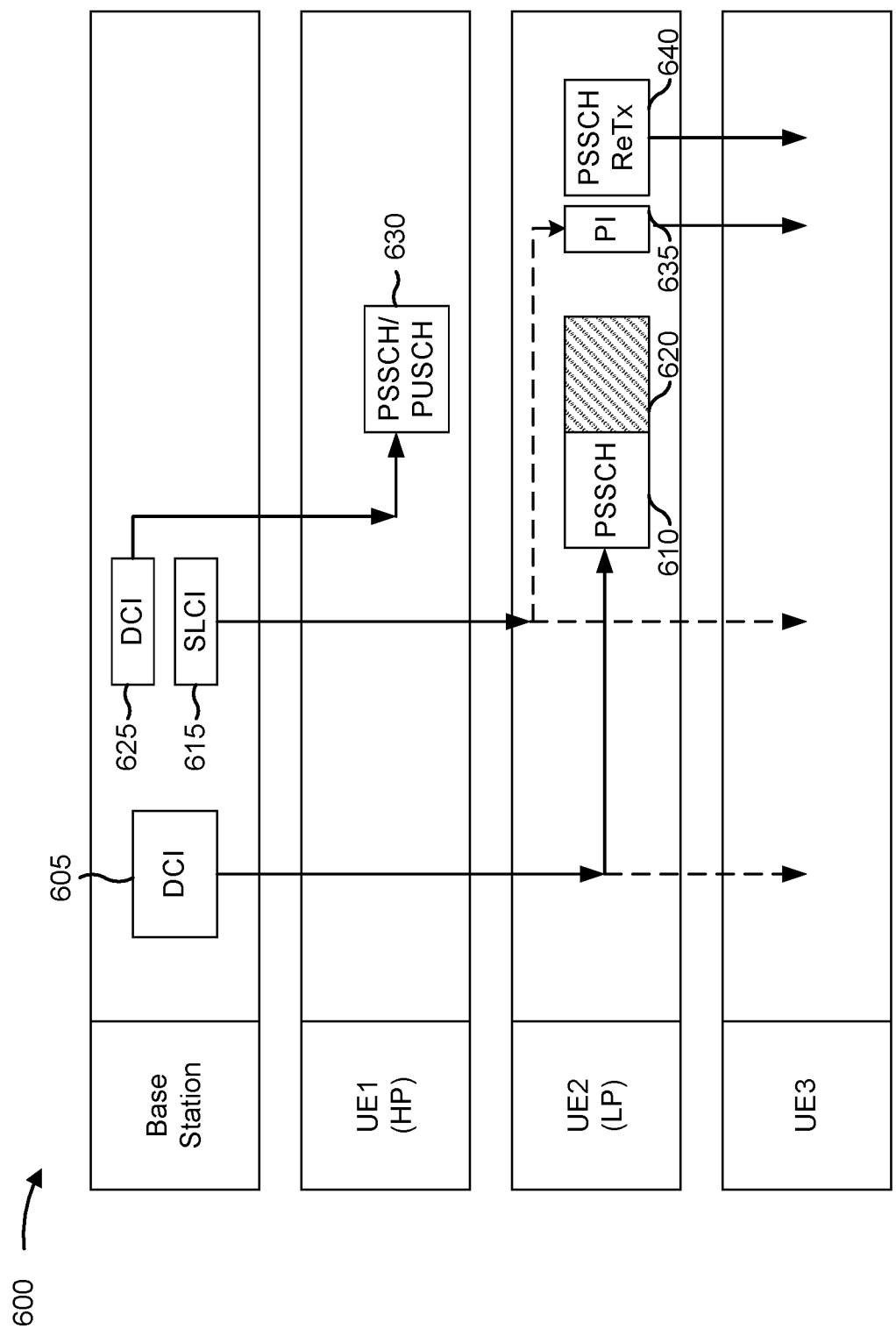
FIG. 6 is a diagram illustrating an example of a sidelink cancellation indication (SLCI), in accordance with the present disclosure.

FIG. 6 is a diagram illustrating an example 600 of an SLCI, in accordance with the present disclosure.

In a sidelink resource allocation mode (e.g., Mode 1) in which a base station allocates resources for sidelink communications between UEs, the base station may indicate scheduled resources for sidelink communications via DCI format 3_0 (DCI 3_0). In some examples, a UE may transmit sidelink communications (e.g., PSSCH/PSCCH) via uplink resources indicated in the DCI 3_0 received from the base station. However, a base station may not be able to use a ULCI (e.g., DCI 2_4) to cancel a scheduled sidelink communication (e.g., PSSCH/PSCCH). This may limit the base station's flexibility in scheduling high priority (e.g., URLLC) traffic if low priority (e.g., eMBB) sidelink traffic cannot be canceled. In some examples, an SLCI may be used to cancel PSSCH and/or PSCCH communications. An SLCI is an indication that cancels a previously scheduled resource for a sidelink communication for a UE.

As shown in FIG. 6, example 600 includes a base station, a first UE (UE1), a second UE (UE2), and a third UE (UE3). UE1 may be a high priority UE that transmits high priority (e.g., URLLC) traffic, and UE2 may be a low priority UE that transmits low priority (e.g., eMBB) traffic. As shown in FIG. 6, the base station may transmit, to UE2, DCI 605 that schedules a sidelink communication for UE2. For example, the DCI 605 may schedule a PSSCH communication to be transmitted from UE2 to UE3. In some examples, the DCI 605 may be DCI 3_0 that includes scheduling information that allocates PSSCH resources 610 for the PSSCH communication. In some cases, such as in a case in which UE3 is within a coverage range of the base station, the base station may transmit the DCI 605 to UE3, as well as UE2. In some cases, such as in a case in which UE3 is not within a coverage range of the base station, UE2 may forward the DCI 605 to UE3.

As further shown in FIG. 6, the base station, prior to the UE2 transmitting the PSSCH communication to UE3 on the allocated PSSCH resources 610, may transmit an SLCI 615 to UE2. In a case in which UE3 is in a coverage range of the base station, the base station may also transmit the SLCI to UE3. The SLCI 615 may cancel one or more resources 620 of the allocated PSSCH resources 610 for the scheduled PSSCH communication from UE2 to UE3. In some cases, such as in the case in which UE3 is not within the coverage range of the base station, UE2 may forward the SLCI 615 to UE3. The SLCI 615 may be included in DCI, and the SLCI 615 may identify time and frequency resources 620, for which PSSCH/PSCCH communications are being canceled for UE2. UE2 in connection with receiving the SLCI 615, may cancel the PSSCH communication scheduled on the resources 620 identified by the SLCI 615. The base station may transmit, to UE1, DCI 625 (e.g., DCI 3_0) allocate resources 630, including the canceled resources 620 identified in the SLCI 615, for a PSSCH communication or a PUSCH communication (e.g., including URLLC traffic) to be transmitted by UE1. In some examples, the base station may transmit the SLCI 615 to UE2 based at least in part on a URLLC traffic arrival in a buffer of UE1 in order to preempt the scheduled PSSCH communication for UE2 with a PSSCH or PUSCH transmission for UE1 that includes the URLLC traffic.

UE2, in connection with receiving the SLCI 615 that cancels the one or more resources 620 of the allocated PSSCH resources 610 for the PSSCH communication, may transmit a preemption indication (PI) 635 to UE3. For example, the PI 635 may be included in SCI transmitted from UE2. The PI 635 may indicate, to UE3 (which may be out of coverage of the base station) that the scheduled PSSCH has been canceled (or preempted). In some examples, the PI 635 may also schedule PSSCH resources 640 for re-transmitting the (previously canceled/preempted) PSSCH communication from UE2 to UE3. UE2 may then transmit the PSSCH communication on the PSSCH resources 640 indicated in the PI 635.

In some examples, a base station may use an SLCI to cancel low priority sidelink (e.g., PSSCH/PSCCH) traffic for high priority uplink (e.g., PUSCH) traffic. In some examples, a base station may use an SLCI to cancel low priority sidelink (e.g., PSSCH/PSCCH) traffic for high priority sidelink traffic. In some examples, a base station may use an SLCI to cancel scheduled sidelink (e.g., PSSCH) re-transmissions. In this case, the base station may re-transmit the data from the PSSCH communication over the Uu interface (e.g., in a PDSCH communication), and the base station may cancel the scheduled sidelink re-transmission resource. As a result, the scheduling flexibility and interference coordination for high priority traffic may be improved, resulting in improved latency and reliability of high priority (e.g., URLLC) traffic.

As indicated above, FIG. 6 is provided as an example. Other examples may differ from what is described with respect to FIG. 6.

Figure 7:
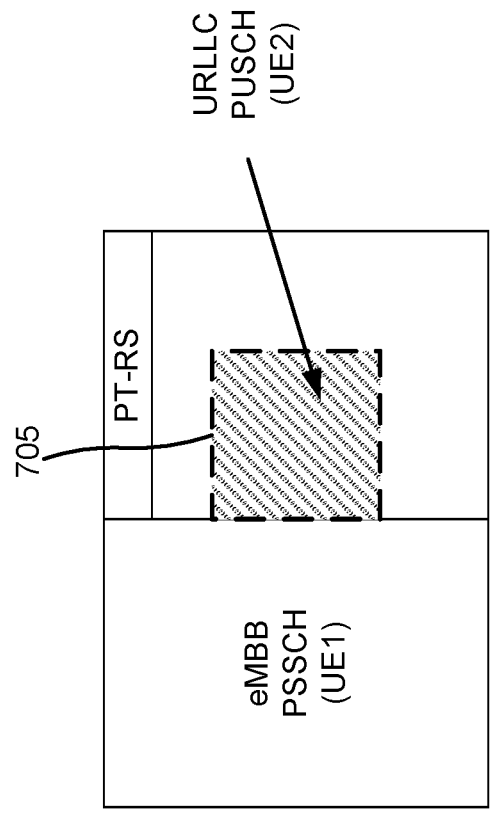
FIG. 7 is a diagram illustrating an example of sidelink cancellation, in accordance with the present disclosure.

FIG. 7 is a diagram illustrating an example 700 of sidelink cancellation, in accordance with the present disclosure. As shown in FIG. 7, example 700 may include a first UE (UE1) and a second UE (UE2). UE1 may be a low priority UE that transmits low priority (e.g., eMBB) traffic, and UE2 may be a high priority UE that transmits high priority (e.g., URLLC) traffic.

In some examples, a ULCI or an SLCI may enable multiplexing of signals transmitted by different UEs. For example, as shown in FIG. 7, UE1 may be allocated PSSCH resources for eMBB PSSCH traffic to be transmitted by UE1 (e.g., to another UE). A base station may transmit an SLCI to UE1 to cancel one or more resources 705 of the allocated PSSCH resources allocated for UE1. The base station may allocate the canceled resources 705 for a PUSCH transmission including URLLC traffic to be transmitted by UE2. In this case, the SLCI may enable multiplexing of the eMBB PSSCH traffic transmitted by UE1 with the URLLC PUSCH traffic transmitted by UE2. For example, UE2 may transmit the URLLC PUSCH traffic using the canceled frequency resources at the same time as the UE1 may transmit the eMBB PSSCH traffic using non-canceled frequency resources surrounding the canceled frequency resources, resulting in frequency division multiplexing (FDM) of the signals transmitted by UE1 and UE2.

In some cases, as shown in FIG. 7, a base station may use an SLCI or a ULCI to schedule simultaneous sidelink and uplink transmissions by different UEs in different frequency resources (e.g., using adjacent subcarriers). Frequency division multiplexed transmission of signals from different UEs may require tight synchronization (e.g., a synchronization error that is less than a threshold) between the transmissions from the different UEs. However, sidelink and uplink UEs may be synchronized differently (e.g., synchronized to different sources), resulting in a synchronization error between the sidelink and uplink transmissions from the UEs. In this case, the synchronization error in the frequency and/or time domain may destroy OFDM orthogonality, and interference between the sidelink and uplink transmissions may be very high due to OFDM sidelobes of the sine cardinal ("sinc") spectrum. Furthermore, puncturing a sidelink or uplink transmission (e.g., to cancel the resources indication by an SLCI or ULCI) may cause a high peak to average power ratio (PAPR). For example, in FIG. 7, puncturing the eMBB PSSCH transmission on the canceled resources 705 may cause the signal transmitted by UE1 to exhibit a high PAPR. A high PAPR may cause power amplifier non-linearity for a UE, which may result in increased interference. Accordingly, multiplexing of sidelink and uplink transmissions from different devices in connection with an SLCI or a ULCI may result in interference between the transmissions, which may decrease the reliability of the uplink transmissions and/or the sidelink transmissions.

As indicated above, FIG. 7 is provided as an example. Other examples may differ from what is described with respect to FIG. 7.

Some techniques and apparatuses described herein enable a UE to perform signal shaping with canceled tones (e.g., OFDM tones or subcarriers canceled by a ULCI or an SLCI) to reduce interference on the canceled tones. "Signal shaping" refers to adjusting a signal to achieve improved frequency domain properties (e.g., reduced OFDM sidelobe leakage) and/or frequency domain properties (e.g., reduced PAPR). In some aspects, a UE may receive a cancellation indication (e.g., a ULCI or an SLCI) that indicates a set of resources in which to cancel an uplink or a sidelink communication. The UE may identify a set of cancellation subcarriers on which to transmit a cancellation signal to perform signal shaping of a data signal based at least in part on a protected frequency range or a protected time range associated with the set of resources indicated by the cancellation indication. The UE may transmit a combined signal including the data signal and the cancellation signal. The UE may transmit the combined signal by transmitting the data signal on one or more subcarriers other than subcarriers included in the set of resources indicated by the cancellation indication, and transmitting the cancellation signal on the set of cancellation subcarriers, resulting in an OFDM waveform that may be referred to as the combined signal. In some aspects, the cancellation signal may reduce leakage in the protected frequency range and/or reduce PAPR in the protected time range. As a result, interference from the data signal transmitted by the UE on a transmission in the canceled resources by another UE may be reduced, which may increase the reliability of uplink and/or sidelink transmissions.

Figure 8:
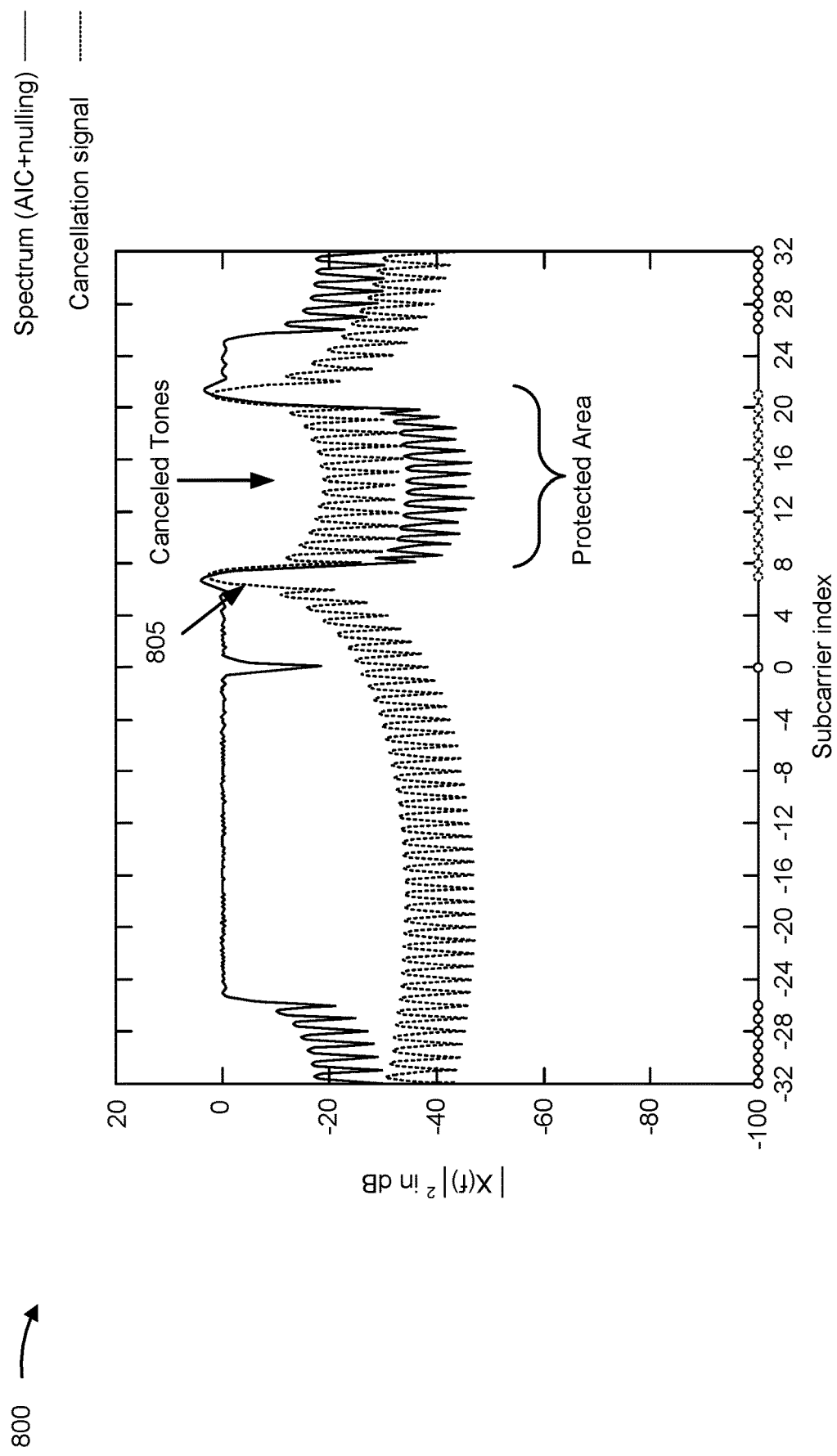
FIGS. 8-11 are diagrams illustrating examples associated with signal shaping with canceled tones, in accordance with the present disclosure.

FIG. 8 is a diagram illustrating an example 800 associated with signal shaping with canceled tones, in accordance with the present disclosure. As shown in FIG. 8, example 800 shows an example of signal shaping using active interference cancellation (AIC) to reduce OFDM sidelobe leakage in a protected area.

In some aspects, a UE may receive (e.g., from a base station) a cancellation indication (e.g., a ULCI or an SLCI) that indicates a set of resources (e.g., time and frequency resources) in which to cancel transmission of a data signal (e.g., uplink or sidelink transmission). For example, as shown in FIG. 8, the cancellation indication may cancel transmission, for the UE, on subcarriers 8-20 assigned to the UE. The subcarriers canceled by the cancellation indication may also be referred to as the "canceled tones." The UE may identify a protected area based at least in part on the cancellation indication. For example, the protected area may be a protected frequency range. In some aspects, the protected frequency range may be the frequency range indicated in the cancellation indication (e.g., the frequency range spanning the canceled tones), as shown in FIG. 8. In some aspects, the protected frequency range may include a subset of the subcarriers canceled by the cancellation indication, or the protected frequency range may include a wider frequency range than the subcarriers canceled by the cancellation indication.

As shown in FIG. 8, the UE, in connection with the canceled transmission in the protected area (e.g., the canceled tones), may use AIC to generate a "spectral notch" in the protected area. "Spectral notch" refers to an area in which the emission spectrum is reduced relative to surrounding areas (e.g., surrounding subcarriers). In some cases, due to OFDM sinc sidelobe, leakage from transmission on other subcarriers (e.g., subcarriers −24 to 7) may occur in the protected area in a case of frequency offset and/or Doppler spread. In some aspects, the UE may use one or more tones (e.g., one or more subcarriers) to generate a cancellation signal 805 to cancel (e.g., reduce) the OFDM sidelobe leakage to the protected area. The UE may identify a set of cancellation subcarriers on which to generate the cancellation signal 805. For example, as shown in FIG. 8, the cancellation signal 805 may be generated by generating cancellation signals using subcarriers adjacent to the canceled tones (e.g., subcarrier 7 and subcarrier 21). In this case, the leakage of the cancellation signal into the protected area may cancel (e.g., reduce) the leakage of a data signal transmission into the protected area. The cancellation subcarriers may be used to apply AIC to reduce in-band and/or out-of-band emission. For example, as shown in FIG. 8, the cancellation signal generated with one pair of tones (e.g., two subcarriers) may suppress the leakage in the protected area by about 20 dB, as compared with other areas of sidelobe leakage shown in FIG. 8 (e.g., at subcarriers −32 to −28, and/or at subcarriers 26 to 32). As a result, interference between a data signal transmitted by the UE and a transmission by another UE using the canceled tones may be reduced.

As indicated above, FIG. 8 is provided as an example. Other examples may differ from what is described with respect to FIG. 8.

Figure 9:
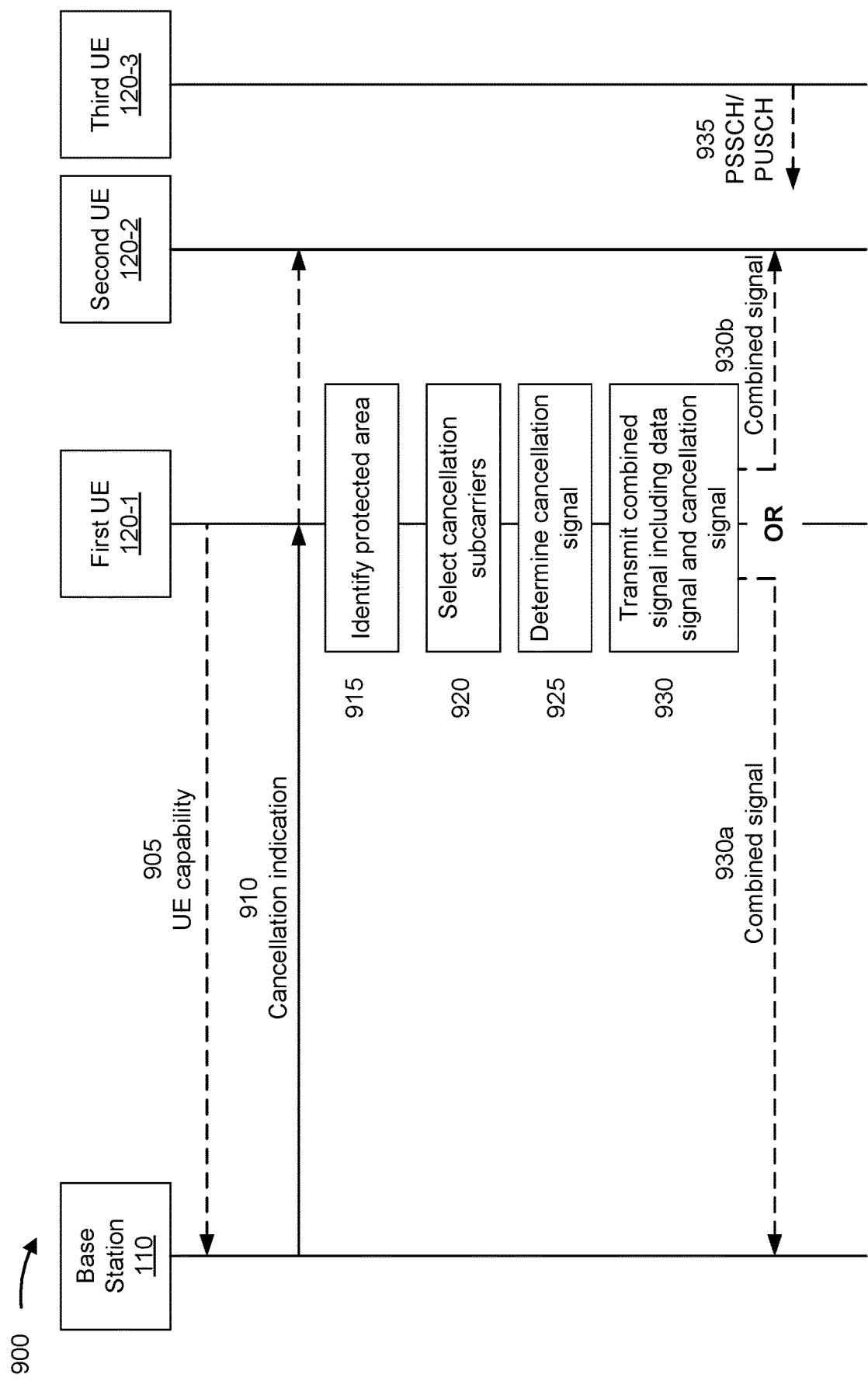

FIG. 9 is a diagram illustrating an example 900 associated with signal shaping with canceled tones, in accordance with the present disclosure. As shown in FIG. 9, example 900 includes communication between a base station 110, a first UE 120-1, a second UE 120-2, and a third UE 120-3. In some aspects, the base station 110 and the UEs 120 may be included in a wireless network, such as wireless network 100. The base station 110 may communicate with the first UE 120-1, the second UE 120-2, and the third UE 120-3 via a wireless access link, which may include an uplink and a downlink. The first UE 120-1, the second UE 120-2, and the third UE 120-3 may communicate via a sidelink.

As shown in FIG. 9, and by reference number 905, the first UE 120-1 may transmit, to the base station 110, an indication of a UE capability for signal shaping. In some aspects, the first UE 120-1 may transmit, to the base station 110, an indication of a UE capability for AIC. For example, the first UE 120-1 may transmit, to the base station 110, an AIC capability report that includes an indication of the UE capability for AIC. In some aspects, the indication of the UE capability for AIC (e.g., the AIC capability report) may include an indication of a maximum number of AIC tones (e.g., a maximum number of cancellation subcarriers for AIC), an indication of one or more supported AIC optimization algorithms, and/or a timing or computation time associated with AIC for the first UE 120-1. The supported AIC optimization algorithms may include one or optimization algorithms (e.g., unconstrained least-square, constrained least-square, or the like) supported by the first UE 120-1 for performing AIC.

In some aspects, the first UE 120-1 may transmit, to the base station 110, an indication of the UE capability for performing one or more other types of signal shaping. For example, the first UE 120-1 may transmit, to the base station 110, an indication of the UE capability for performing signal shaping to reduce amplitude peaks of a signal in a time domain.

As further shown in FIG. 9, and by reference number 910, the base station 110 may transmit, to the first UE 120-1, a cancellation indication. The first UE 120-1 may receive the cancellation indication transmitted by the base station 110. The cancellation indication may indicate a set of resources in which to cancel a scheduled transmission (e.g., an uplink transmission or a sidelink transmission) by the first UE 120-1.

In some aspects, the cancellation indication may be a ULCI. The ULCI may cancel one or more resources of PUSCH resources allocated for a scheduled PUSCH communication by the first UE 120-1. For example, PUSCH resources allocated for the scheduled PUSCH may be indicated in DCI that schedules the scheduled PUSCH communication. In some aspects, the base station 110 may transmit the ULCI to the first UE 120-1 in DCI, such as DCI 2_4. For example, the base station may transmit the ULCI to the first UE 120-1 in GC-PDCCH DCI 2_4 using a CI-RNTI. The payload of the DCI 2_4 may indicate which time and frequency resources (e.g., which RBs) are being canceled. In some aspects, the payload of the DCI 2_4 may include a sequence of bits (e.g., 14 bits) that maps to a two-dimensional bit field to indicate a pattern of resources to be canceled, within a time and frequency resource region (e.g., groups of RBs at one or more different frequencies) represented by the two-dimensional bit field. The time and frequency resource region represented by the two-dimensional bit field (e.g., the time and frequency resource region, from which the set of resources to be canceled are selected) may be offset from the ULCI (e.g., the DCI 2_4) by a time offset value. For example, a first symbol of the time and frequency resource region may be offset from a last symbol of the DCI 2_4 including the ULCI by the time offset value. In some aspects, the base station 110 may configure the time offset value based at least in part on the indication of the computation time associated with AIC included in the AIC capability report received from the first UE 120-1 to allow the first UE 120-1 enough time to perform AIC for a scheduled uplink transmission for which a subset of the allocated PUSCH resources have been canceled. The first UE 120-1, in connection with receiving the ULCI 515, may cancel PUSCH communications scheduled on the resources 520 identified by the ULCI 515. In some aspects, the base station 110 may select the set of resources for which uplink communications are to be canceled based at least in part on an arrival of high priority (e.g., URLLC) traffic in a buffer of another UE (e.g., the third UE 120-3). For example, the base station 110 may allocate the canceled resources to the third UE 120-3 for an uplink (e.g., PUSCH) or sidelink (e.g., PSSCH) communication from the third UE 120-3.

In some aspects, the cancellation indication may be an SLCI. The SLCI may cancel one or more resources of PSSCH resources allocated for a scheduled PSSCH communication by the first UE 120-1 (e.g., a scheduled PSSCH communication from the first UE 120-1 to the second UE 120-2). For example, PSSCH resources allocated for the scheduled PSSCH communication may be indicated in DCI (e.g., DCI 3_0) that schedules the scheduled PSSCH communication. In some aspects, the base station 110 may transmit the SLCI to the first UE 120-1 and one or more other UEs (e.g., the second UE 120-2, the third UE 120-3, and/or one or more other UEs in a coverage range of the base station 110). In some aspects, the base station 110 may include the SLCI in DCI transmitted in a PDCCH communication, such as a GC-PDCCH communication. The SLCI may indicate a set of resources in which to cancel sidelink communications. In some aspects, the SLCI may include a sequence of bits (e.g., 14 bits) that maps to a two-dimensional bit field to indicate a pattern of resources to be canceled, within a time and frequency resource region (e.g., groups of RBs at one or more different frequencies) represented by the two-dimensional bit field. The time and frequency resource region represented by the two-dimensional bit field (e.g., the time and frequency resource region, from which the set of resources to be canceled are selected) may be offset from the SLCI by a time offset value. For example, a first symbol of the time and frequency resource region may be offset from a last symbol of the DCI including the SLCI by the time offset value. In some aspects, the base station 110 may configure the time offset value based at least in part on the indication of the computation time associated with AIC included in the AIC capability report received from the first UE 120-1 to allow the first UE 120-1 enough time to perform AIC for a scheduled sidelink transmission for which a subset of the allocated PSSCH resources have been canceled. In some aspects, the base station 110 may select the set of resources for which sidelink communications are to be canceled based at least in part on an arrival of high priority (e.g., URLLC) traffic in a buffer of a UE (e.g., the third UE 120-3). For example, the base station 110 may allocate the canceled resources to the third UE 120-3 for an uplink (e.g., PUSCH) or sidelink (e.g., PSSCH) communication from the third UE 120-3.

In some aspects, in a case in which the cancellation indication is the SLCI, the first UE 120-1 may transmit the SLCI to the second UE 120-2. For example, the first UE 120-1 may transmit the SLCI to the second UE 120-2 in a case in which the second UE 120-2 is out of coverage (e.g., not within the coverage range) of the base station 110. In some aspects, the first UE 120-1 may broadcast the SLCI to one or more other UEs. For example, the first UE 120-1 may broadcast the SLCI (e.g., in SCI) to all sidelink UEs within a range of the first UE 120-1. In some aspects, the second UE 120-2 may be in the coverage range of the base station 110, and the second UE 120-2 may receive the SLCI from the base station 110. In some aspects, the second UE 120-2 may be out of coverage of the base station 110, and the second UE 120-2 may receive the SLCI from the first UE 120-1.

In some aspects, the cancellation indication (e.g., the ULCI or SLCI) may include one or more power thresholds (e.g., transmission power thresholds) for cancellation subcarriers (e.g., AIC tones) to be used for signal shaping. For example, the cancellation indication may include an indication of a first power threshold associated with subcarriers within a protected area (e.g., a protected frequency range) and/or a second power threshold associated with subcarriers outside of the protected area (e.g., the protected frequency range). In some aspects, the cancellation indication may include an indication of a number of cancellation subcarriers (e.g., AIC tones) to be used for signal shaping. In some aspects, the cancellation indication may indicate positions of the cancellation subcarriers (e.g., AIC tone positions) to be used for signal shaping. For example, the cancellation indication may indicate to use subcarrier positions at edges of the remaining allocated uplink or sidelink resources (e.g., outside of the canceled/protected area), subcarrier positions at edges of the canceled/protected area (e.g., within the canceled/protected area), or a combination thereof. Additionally, or alternatively, the cancellation indication may indicate a preconfigured pattern for the first UE 120-1 to use to perform signal shaping (e.g., AIC) or multiple preconfigured patterns from which the first UE 120-1 can select to perform signal shaping.

In some aspects, the cancellation indication may indicate the protected area (or optimization area). For example, the protected area may include a range of subcarrier positions (e.g., a protected frequency range) where emissions from the first UE 120-1 are to be reduced (e.g., minimized). In some aspects, the protected area may be the same as the frequency range of the canceled tones (e.g., the range of the frequency resources canceled by the cancellation indication). In some aspects, the cancellation indication may indicate a protected area (or optimization area) that has a different frequency range from the range of the canceled tones. For example, the cancellation indication may indicate a protected area that covers a subset of the tones (e.g., subcarriers) in the set of canceled tones, or the cancellation indication may indicate a protected area that includes one or more tones (e.g., subcarriers) that are outside of the set of canceled tones.

In some aspects, the cancellation indication may indicate a minimum interference suppression level for the protected area. For example, the minimum interference suppression level may be a target (or required) minimum interference suppression level to be achieved by the signal shaping (e.g., AIC) to be performed by the first UE 120-1. For example, the cancellation indication may indicate a minimum amount (e.g., −40 dBm) by which power leakage is to be suppressed in the protected area, and the first UE 120-1 may select an AIC method/algorithm to achieve the minimum interference suppression level.

As further shown in FIG. 9, and by reference number 915, the first UE 120-1 may identify the protected area associated with the cancellation indication (e.g., the ULCI or SLCI). The protected area (or optimization area) may include a protected frequency range and/or a protected time range. In some aspects, the first UE 120-1 may determine the protected area based at least in part on the cancellation indication. In some aspects, the protected frequency range and the protected time range may be the same as the frequency range and the time range of the canceled resources indicated by the cancellation indication. In some aspects, the protected area (e.g., the protected frequency range and/or the protected time range) may be indicated separately in the cancellation indication from the canceled resources. In some aspects, the protected area may include a subset of the canceled time and/or frequency resources.

As further shown in FIG. 9, and by reference number 920, the first UE 120-1 may select a set of cancellation subcarriers to use for signal shaping. The set of cancellation subcarriers may include one or more subcarriers on which to transmit a cancellation signal to perform signal shaping of a data signal to be transmitted by the first UE 120-1 based at least in part on the protected area (e.g., the protected frequency range and/or the protected time range) associated with the canceled resources indicated by the cancellation indication. In some aspects, the set of subcarriers may be a set of subcarriers (e.g., AIC tones) to perform AIC to generate a cancellation signal to reduce power leakage (e.g., OFDM sidelobe leakage) in the protected frequency range.

In some aspects, the first UE 120-1 may select (or identify) a number of cancellation subcarriers to be used for AIC/signal shaping and/or subcarrier positions to be used for AIC/signal shaping. In some aspects, the first UE 120-1 may select the number of cancellation subcarriers in the set of cancellation subcarriers based at least in part on an indication of the number of cancellation subcarriers in the cancellation indication, a maximum number of cancellation subcarriers (e.g., AIC tones) supported by the first UE 120-1, and/or a determination of a set of cancellation subcarriers to optimize the suppression of the power leakage in the protected area.

In some aspects, the set of cancellation subcarriers may include one or more subcarriers within the protected area (e.g., within the protected frequency range). In some aspects, the cancellation subcarriers within the protected area may be subject to a first transmission power threshold. For example, a transmission power of a cancellation signal generated on a subcarrier within the protected area may not exceed the first transmission power threshold. In some aspects, the set of cancellation subcarriers may include one or more subcarriers outside of the protected area (e.g., outside of the protected frequency range). In some aspects, the set of cancellation subcarriers may include only subcarriers outside of the protected area. In some aspects, the cancellation carriers outside of the protected area may be subject to a second transmission power threshold. In some aspects, the second transmission power threshold may be larger than the first transmission power threshold. In this case, the first UE 120-1 may be permitted to transmit cancellation signals using a higher transmission power on subcarriers outside of the protected area than on subcarriers within the protected area. In some aspects, the set of cancellation subcarriers may include one or more subcarriers within the protected area and one or more subcarriers outside of the protected area. In this case, the cancellation subcarriers within the protected area may be subject to the first transmission power threshold, and the cancellation subcarriers outside of the protected area may be subject to the second transmission power threshold. In some aspects, cancellation signals transmitted on the cancellation subcarriers within the protected area may be weighted based at least in part on the first transmission power threshold, and cancellation signals transmitted on the cancellation subcarriers outside of the protected area may be weighted based at least in part on the second threshold.

In some aspects, the first and second power thresholds may be indicated in the cancellation indication. In some aspects, the first and second power thresholds may be transmitted to the first UE 120-1 in a radio resource control (RRC) message from the base station 110.

As further shown in FIG. 9, and by reference number 925, the first UE 120-1 may determine the cancellation signal to be transmitted using the identified set of cancellation subcarriers to perform signal shaping of a data signal in the protected area. In some aspects, the first UE 120-1 may determine a cancellation signal to be transmitted on the set of subcarriers to perform AIC to cancel and/or reduce power leakage (e.g., OFDM sidelobe leakage) in the protected frequency range. The first UE 120-1 may calculate symbols to be transmitted on the selected cancellation subcarriers (e.g., AIC subcarriers) based at least in part on the power thresholds associated with the cancellation subcarriers. For example, the first UE 120-1 may use an optimization algorithm (e.g., unconstrained least-square, constrained least-square, or the like) to calculate the symbols to be transmitted on the set of cancellation subcarriers that result in a cancellation signal that maximizes suppression of power leakage from the data signal in the protected frequency range (e.g., or minimizes power leakage from the data signal in the protected frequency range), subject to the power thresholds associated with the cancellation subcarriers. In some aspects, the calculation of the symbols on the cancellation subcarriers may be based at least in part on the subcarrier positions, the optimization area (e.g., the protected frequency range), and based at least in part on data symbols on other subcarriers (e.g., for the data signal to be transmitted). In some aspects, the calculation of the symbols on the cancellation subcarriers may be based at least in part on the subcarrier positions and the optimization area (e.g., the protected frequency range), without considering the data symbols on the other subcarriers.

In some aspects, the first UE 120-1 may determine a cancellation signal to be transmitted on the cancellation subcarriers to modulate the data signal in the frequency domain to reduce (or cancel) amplitude peaks of the data signal in the time domain (e.g., in the protected time range). For example, the first UE 120-1 may use an optimization algorithm to calculate symbols to be transmitted on the cancellation subcarriers that result in a cancellation signal that minimizes PAPR in the protected time range, subject to the transmission power thresholds associated with the cancellation subcarriers.

As further shown in FIG. 9, and by reference number 930, the first UE 120-1 may transmit a combined signal including the data signal and the cancellation signal. The first UE 120-1 may generate and transmit an OFDM waveform that multiplexes the data signal with the cancellation signal. For example, the first UE 120-1 may transmit the data signal on subcarriers other than the subcarriers included in the canceled resources indicated by the cancellation indication (e.g., using remaining allocated frequency resources that were not canceled), and the first UE 120-1 may transmit the cancellation signal on the set of cancellation subcarriers, resulting in the combined signal (e.g., the OFDM waveform). The first UE 120-1 may transmit the cancellation signal, together with the data signal, in order to perform data shaping of the data signal.

As shown by reference number 930a, in some aspects, the first UE 120-1 may transmit the combined signal, including the data signal (e.g., an uplink data signal) and the cancellation signal, to the base station 110 in an uplink communication (e.g., a PUSCH communication). In some aspects, power leakage may be reduced in the protected area (e.g., the canceled tones associated with a ULCI) of the combined signal (e.g., resulting from modulating the data signal with the AIC cancellation signal), as compared with the original data signal to be transmitted. In some aspects, modulation of the data signal with the cancellation signal may result in a combined signal in which PAPR may be reduced over the time resources indicated in the ULCI, as compared with the original data signal to be transmitted.

As further shown by reference number 930a, in some aspects, the base station 110 may receive the combined signal transmitted by the first UE 120-1. In this case, the base station 110 may know the signal shaping configuration (e.g., the AIC configuration) used to generate the cancellation signal (e.g., based at least in part on the UE capability information received from the first UE 120-1 and/or information included in the ULCI transmitted to the first UE 120-1). The base station 110 may discard the symbols received on the cancellation subcarriers (e.g., AIC subcarriers). In this case, the symbols received on the cancellation subcarriers may be the symbols associated with the cancellation signal. The base station 110 may decode the data received on subcarriers other than the cancellation subcarriers (e.g., AIC subcarriers).

As shown by reference number 930b, in some aspects, the first UE 120-1 may transmit the combined signal, including the data signal (e.g., a sidelink data signal) and the cancellation signal, to the second UE 120-2 in a sidelink communication (e.g., a PSSCH communication). In this case, the first UE 120-1 may be the Tx UE and the second UE 120-2 may be the Rx UE for the sidelink communication. In some aspects, power leakage may be reduced in the protected area (e.g., the canceled tones associated with a SLCI) of the combined signal (e.g., resulting from modulating the data signal with the AIC cancellation signal), as compared with the original data signal to be transmitted. In some aspects, modulation of the data signal with the cancellation signal may result in a combined signal in which PAPR may be reduced over the time resources indicated in the SLCI, as compared with the original data signal to be transmitted.

In some aspects, the first UE 120-1 may also transmit, to the second UE 120-2, an indication of a signal shaping configuration (e.g., the AIC configuration) used to generate the cancellation signal. For example, the first UE 120-1 may transmit, to the second UE 120-2, an indication of the set of cancellation subcarriers (e.g., AIC subcarriers used). The indication of the set of cancellation subcarriers may include an indication of the subcarrier positions for the cancellation subcarriers used to generate the cancellation signal. In some aspects, the first UE 120-1 may transmit, to the second UE 120-2 SCI (e.g., SCI-2) including the indication of the set of cancellation subcarriers. In some aspects, if the second UE 120-2 is in a coverage area of the base station 110, the base station 110 may transmit, to the second UE 120-2, the indication of the signal shaping configuration (e.g., the indication of the set of cancellation subcarriers) used by the first UE 120-1. For example, the second UE 120-2 may receive the indication of the signal shaping configuration from the base station 110 or from the first UE 120-1 based at least in part on whether the second UE 120-2 is in the coverage area of the base station 110 or out of the coverage area of the base station 110.

As further shown by reference number 930b, in some aspects, the second UE 120-2 may receive the combined signal transmitted by the first UE 120-1. In this case, based at least in part on the indication of the signal shaping configuration received from the first UE 120-1 or the base station 110, the second UE 120-2 may discard the symbols received on the cancellation subcarriers (e.g., AIC subcarriers). In this case, the symbols received on the cancellation subcarriers may be the symbols associated with the cancellation signal. The second UE 120-2 may decode the data received on subcarriers other than the cancellation subcarriers (e.g., AIC subcarriers).

As further shown in FIG. 9, and by reference number 935, the third UE 120-3 may transmit a sidelink (e.g., PSSCH) communication or an uplink (e.g., PUSCH) communication using the canceled resources indicated in the ULCI or the SLCI transmitted by the base station 110. For example, the PSSCH or PUSCH communication may be scheduled by DCI received by the third UE 120-3 from the base station 110, and the DCI may allocate the canceled resources for the PSSCH or PUSCH communication. In some aspects, the base station 110 may allocate the canceled resources for the PSSCH or PUCCH communication based at least in part on the traffic transmitted in the PSSCH or PUCCH communication being priority (e.g., URLLC) traffic. As a result of the signal shaping (AIC) performed by the first UE 120-1, interference on the PSSCH or PUCCH communication transmitted by the third UE 120-3 (e.g., due to OFDM sidelobe leakage in the canceled tones and/or PAPR resulting from puncturing the data signal transmitted by the first UE 120-1) may be reduced.

As indicated above, FIG. 9 is provided as an example. Other examples may differ from what is described with respect to FIG. 9.

Figure 10:
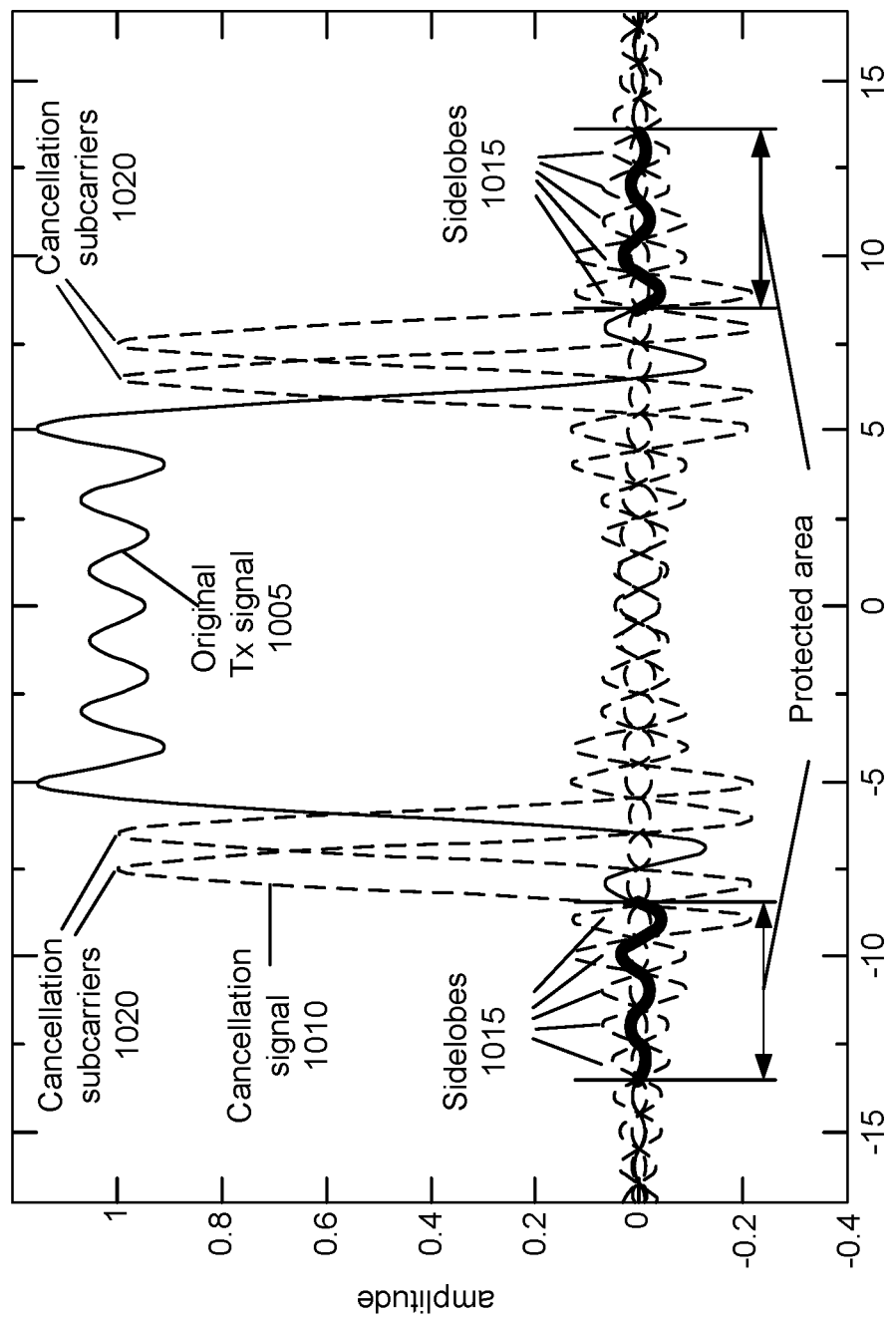

FIG. 10 is a diagram illustrating an example 1000 associated with signal shaping with canceled tones, in accordance with the present disclosure. As shown in FIG. 10, example 1000 shows an original data signal 1005 to be transmitted by a UE and a cancellation signal 1010 for AIC. As shown in FIG. 10, a protected area (e.g., a protected frequency range) may be associated with canceled resources (e.g., a set of canceled subcarriers) indicated in a cancellation indication (e.g., an SLCI or a ULCI). The original data signal 1005 may include sidelobes 1015 to be suppressed in the protected area. The UE may select a set of cancellation subcarriers 1020, and the UE may generate the cancellation signal 1010 on the cancellation subcarriers 1020 to suppress the sidelobes 1015 in the protected area. As shown in FIG. 10, the set of cancellation subcarriers 1020 selected in example 1000 include four cancellation subcarriers 1020 that are outside the protected area. In this case, the cancellation signal 1010 transmitted on the cancellation subcarriers 1020 may be subject to the first transmission power threshold, which may be higher than the second power transmission threshold associated with cancellation subcarriers within the protected area.

As indicated above, FIG. 10 is provided as an example. Other examples may differ from what is described with respect to FIG. 10.

Figure 11:
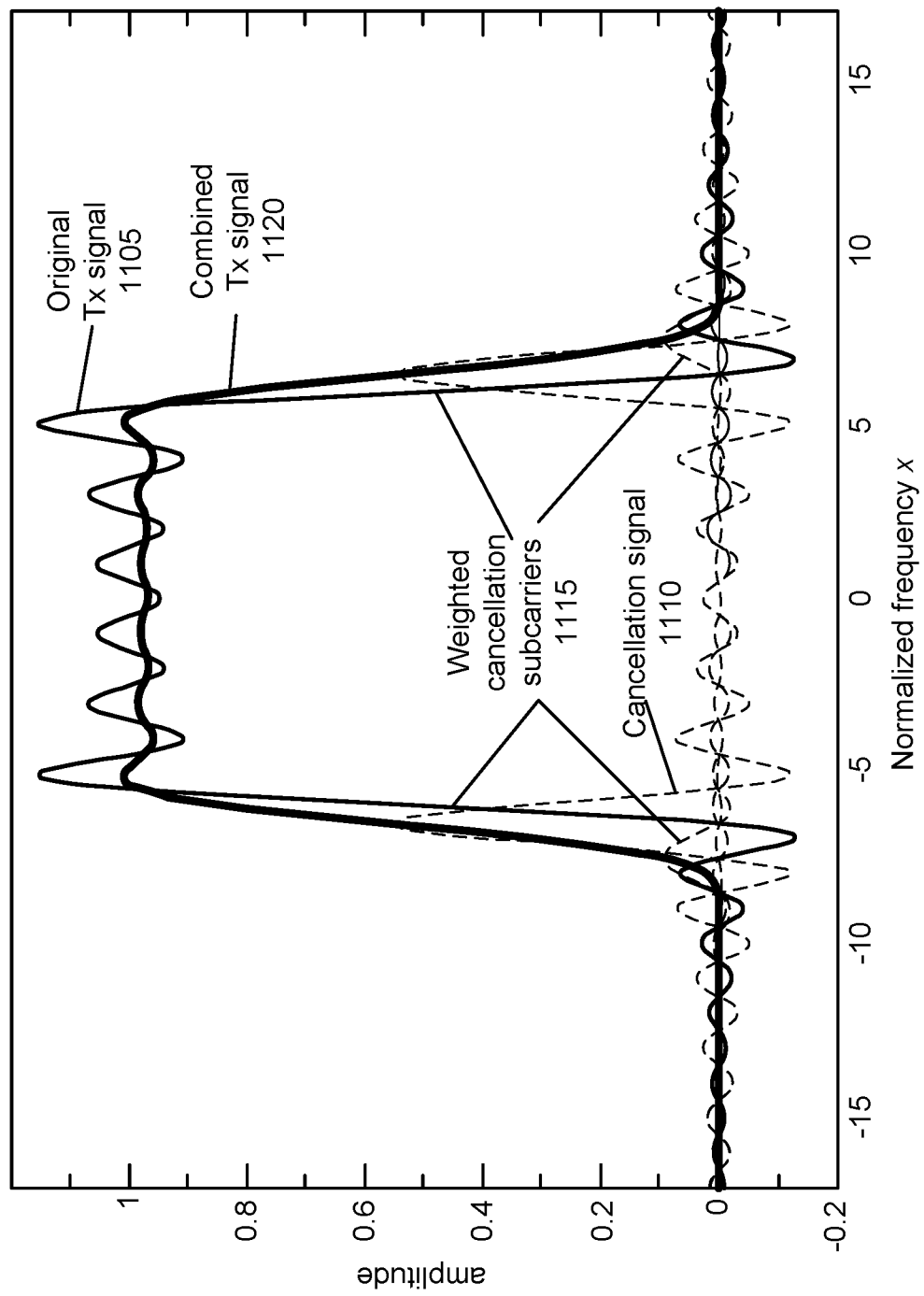

FIG. 11 is a diagram illustrating an example 1100 associated with signal shaping with canceled tones, in accordance with the present disclosure. As shown in FIG. 11, example 1100 shows an original data signal 1105 to be transmitted by a UE and a cancellation signal 1110 for AIC. As shown in FIG. 11, the UE may select a set of cancellation subcarriers 1115, and the UE may generate the cancellation signal 1110 on the cancellation subcarriers 1115 to suppress sidelobes of the original data signal 1105 in a protected area associated with canceled resources indicated in a cancellation indication (e.g., an SLCI or a ULCI). As shown in FIG. 11, the set of cancellation subcarriers 1115 selected in example 1100 include two cancellation subcarriers 1115 that are outside the protected area and two cancellation subcarriers 1115 that are within the protected area. In this case, transmission power for the cancellation signal 1110 on the cancellation subcarriers 1115 may be weighted by the first transmission power threshold for the cancellation subcarriers 1115 outside of the protected area and weighted by the second transmission power threshold (which may be smaller than the first transmission power threshold) for the cancellation subcarriers 1115 within the protected area. The UE may transmit a combined signal 1120 resulting from combined transmission of the original data signal 1105 and the cancellation signal 1110.

As indicated above, FIG. 11 is provided as an example. Other examples may differ from what is described with respect to FIG. 11.

Figure 12:
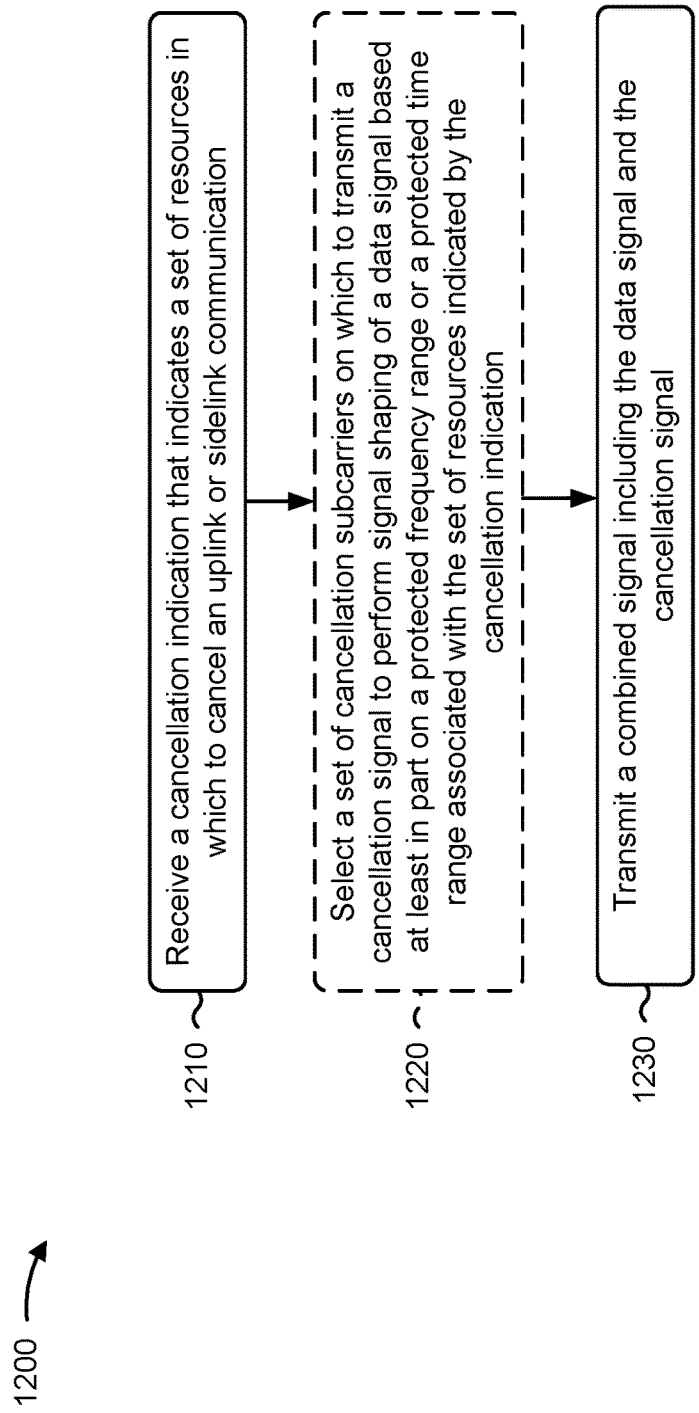
FIGS. 12-14 are diagrams illustrating example processes associated with signal shaping with canceled tones, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with signal shaping with canceled tones.

As shown in FIG. 12, in some aspects, process 1200 may include receiving a cancellation indication that indicates a set of resources in which to cancel an uplink or sidelink communication (block 1210). For example, the UE (e.g., using communication manager 140 and/or reception component 1502, depicted in FIG. 15) may receive a cancellation indication that indicates a set of resources in which to cancel an uplink or sidelink communication, as described above, for example, with reference to FIGS. 8, 9, 10, and/or 11.

As further shown in FIG. 12, in some aspects, process 1200 may include selecting a set of cancellation subcarriers on which to transmit a cancellation signal to perform signal shaping of a data signal based at least in part on a protected frequency range or a protected time range associated with the set of resources indicated by the cancellation indication (block 1220). For example, the UE (e.g., using communication manager 140 and/or selection component 1508, depicted in FIG. 15) may select a set of cancellation subcarriers on which to transmit a cancellation signal to perform signal shaping of a data signal based at least in part on a protected frequency range or a protected time range associated with the set of resources indicated by the cancellation indication, as described above, for example, with reference to FIGS. 8, 9, 10, and/or 11. Block 1220 is illustrated using a dashed line in FIG. 12 to indicate that block 1220 is optional in some aspects.

As further shown in FIG. 12, in some aspects, process 1200 may include transmitting a combined signal including the data signal and the cancellation signal (block 1230). In some aspects, transmitting the combined signal may include transmitting the data signal on one or more subcarriers other than subcarriers included in the set of resources indicated by the cancellation indication, and transmitting the cancellation signal on the set of cancellation subcarriers for performing signal shaping of the data signal. For example, the UE (e.g., using communication manager 140 and/or transmission component 1504, depicted in FIG. 15) may transmit a combined signal including the data signal and the cancellation signal, as described above, for example, with reference to FIGS. 8, 9, 10, and/or 11. In some aspects, the UE (e.g., using communication manager 140 and/or transmission component 1504, depicted in FIG. 15) may transmit the data signal on one or more subcarriers other than subcarriers included in the set of resources indicated by the cancellation indication, and transmit the cancellation signal on the set of cancellation subcarriers for performing signal shaping of the data signal, as described above, for example, with reference to FIGS. 8, 9, 10, and/or 11.

Process 1200 may include additional aspects, such as any single aspect or any combination of aspects described below and/or in connection with one or more other processes described elsewhere herein.

In a first aspect, the set of cancellation subcarriers includes one or more subcarriers in the protected frequency range.

In a second aspect, alone or in combination with the first aspect, the set of cancellation subcarriers includes one or more subcarriers outside of the protected frequency range.

In a third aspect, alone or in combination with one or more of the first and second aspects, the set of cancellation subcarriers includes at least one of one or more subcarriers within the protected frequency range and associated with a first transmission power threshold, or one or more subcarriers outside of the protected frequency range and associated with a second transmission power threshold.

In a fourth aspect, alone or in combination with one or more of the first through third aspects, process 1200 includes receiving an indication of the first transmission power threshold and the second transmission power threshold.

In a fifth aspect, alone or in combination with one or more of the first through fourth aspects, the cancellation signal is an active interference cancellation signal to suppress leakage of the data signal to the protected frequency range from subcarriers outside of the protected frequency range.

In a sixth aspect, alone or in combination with one or more of the first through fifth aspects, process 1200 includes calculating symbols for the active interference cancellation signal on the set of cancellation subcarriers based at least in part on one or more transmission power thresholds associated with the set of cancellation subcarriers.

In a seventh aspect, alone or in combination with one or more of the first through sixth aspects, transmitting the combined signal comprises generating an orthogonal frequency division multiplexing (OFDM) waveform including the data signal and the active interference cancellation signal.

In an eighth aspect, alone or in combination with one or more of the first through seventh aspects, process 1200 includes transmitting, to a base station, an indication of a UE capability for active interference cancellation.

In a ninth aspect, alone or in combination with one or more of the first through eighth aspects, the indication of the UE capability for active interference cancellation includes at least one of an indication of a maximum number of cancellation subcarriers for active interference cancellation, an indication of one or more supported active interference cancellation algorithms, or an indication of a computation time associated with active interference cancellation.

In a tenth aspect, alone or in combination with one or more of the first through ninth aspects, the cancellation indication further indicates at least one of one more transmission power thresholds for cancellation subcarriers in the set of cancellation subcarriers, a number of the cancellation subcarriers in the set of cancellation subcarriers, positions of the cancellation subcarriers in the set of cancellation subcarriers, the protected frequency range, or a minimum interference suppression level for the protected frequency range.

In an eleventh aspect, alone or in combination with one or more of the first through tenth aspects, the cancellation signal is a signal modulated with the data signal on the set of cancellation subcarriers to reduce amplitude peaks of the data signal in the protected time range.

In a twelfth aspect, alone or in combination with one or more of the first through eleventh aspects, the cancellation indication is an uplink cancellation indication, wherein the data signal is an uplink data signal, and wherein transmitting the combined signal comprises transmitting the combined signal, including the uplink data signal and the cancellation signal, to a base station.

In a thirteenth aspect, alone or in combination with one or more of the first through twelfth aspects, the cancellation indication is a sidelink cancellation indication, wherein the data signal is a sidelink data signal, and wherein transmitting the combined signal comprises transmitting the combined signal, including the sidelink data signal and the cancellation signal, to a receiving UE.

In a fourteenth aspect, alone or in combination with one or more of the first through thirteenth aspects, process 1200 includes transmitting, to the receiving UE, an indication of the set of cancellation subcarriers and a configuration of the cancellation signal.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
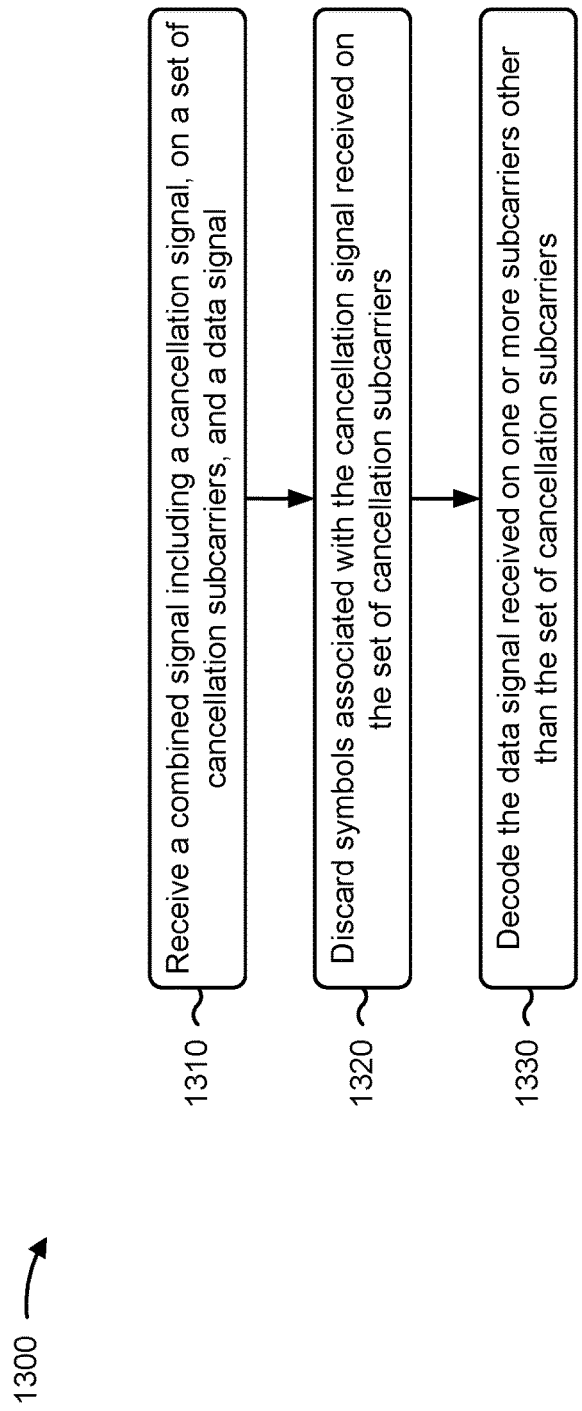

FIG. 13 is a diagram illustrating an example process 1300 performed, for example, by a wireless network device, in accordance with the present disclosure. Example process 1300 is an example where the wireless network device (e.g., base station 110 or UE 120) performs operations associated with signal shaping with canceled tones.

As shown in FIG. 13, in some aspects, process 1300 may include receiving, from a first UE, a combined signal including a cancellation signal, on a set of cancellation subcarriers, and a data signal (block 1310). For example, the wireless network device (e.g., using communication manager 140 and/or reception component 1502, depicted in FIG. 15, or communication manager 150 and/or reception component 1602, depicted in FIG. 16) may receive, from a first UE, a combined signal including a cancellation signal, on a set of cancellation subcarriers, and a data signal, as described above, for example, with reference to FIGS. 8, 9, 10, and/or 11.

As further shown in FIG. 13, in some aspects, process 1300 may include discarding symbols associated with the cancellation signal received on the set of cancellation subcarriers (block 1320). For example, the wireless network device (e.g., using communication manager 140 and/or discarding component 1510, depicted in FIG. 15, or communication manager 150 and/or discarding component 1608, depicted in FIG. 16) may discard symbols associated with the cancellation signal received on the set of cancellation subcarriers, as described above, for example, with reference to FIGS. 8, 9, 10, and/or 11.

As further shown in FIG. 13, in some aspects, process 1300 may include decoding the data signal received on one or more subcarriers other than the set of cancellation subcarriers (block 1330). For example, the wireless network device (e.g., using communication manager 140 and/or decoding component 1512, depicted in FIG. 15, or communication manager 150 and/or decoding component 1610, depicted in FIG. 16) may decode the data signal received on one or more subcarriers other than the set of cancellation subcarriers, as described above, for example, with reference to FIGS. 8, 9, 10, and/or 11.

Process 1300 may include additional aspects, such as any single aspect or any combination of aspects described below and/or in connection with one or more other processes described elsewhere herein.

In a first aspect, the cancellation signal is an active interference cancellation signal to suppress leakage of the data signal to a protected frequency range from subcarriers outside of the protected frequency range.

In a second aspect, alone or in combination with the first aspect, the cancellation signal is a signal modulated with the data signal on the set of cancellation subcarriers to reduce amplitude peaks of the data signal in a protected time range.

In a third aspect, alone or in combination with one or more of the first and second aspects, the wireless network device is a base station.

In a fourth aspect, alone or in combination with one or more of the first through third aspects, process 1300 includes transmitting, to the first UE, a cancellation indication that indicates a set of resources in which to cancel an uplink or sidelink communication, wherein receiving the combined signal comprises receiving the combined signal at a time resource indicated by the cancellation indication.

In a fifth aspect, alone or in combination with one or more of the first through fourth aspects, the cancellation indication further indicates at least one of one or more transmission power thresholds for cancellation subcarriers in the set of cancellation subcarriers, a number of the cancellation subcarriers in the set of cancellation subcarriers, positions of the cancellation subcarriers in the set of cancellation subcarriers, a protected frequency range, or a minimum interference suppression level for the protected frequency range.

In a sixth aspect, alone or in combination with one or more of the first through fifth aspects, process 1300 includes receiving, from the first UE, an indication of a UE capability for active interference cancellation.

In a seventh aspect, alone or in combination with one or more of the first through sixth aspects, the indication of the UE capability for active interference cancellation includes at least one of an indication of a maximum number of cancellation subcarriers for active interference cancellation, an indication of one or more supported active interference cancellation algorithms, or an indication of a computation time associated with active interference cancellation.

In an eighth aspect, alone or in combination with one or more of the first through seventh aspects, the wireless network device is a second UE.

In a ninth aspect, alone or in combination with one or more of the first through eighth aspects, process 1300 includes receiving an indication of the set of cancellation subcarriers and a configuration of the cancellation signal.

In a tenth aspect, alone or in combination with one or more of the first through ninth aspects, receiving the indication of the set of cancellation subcarriers and the configuration of the cancellation signal comprises receiving the indication of the set of cancellation subcarriers and the configuration of the cancellation signal from the first UE.

In an eleventh aspect, alone or in combination with one or more of the first through tenth aspects, receiving the indication of the set of cancellation subcarriers and the configuration of the cancellation signal comprises receiving the indication of the set of cancellation subcarriers and the configuration of the cancellation signal from a base station.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
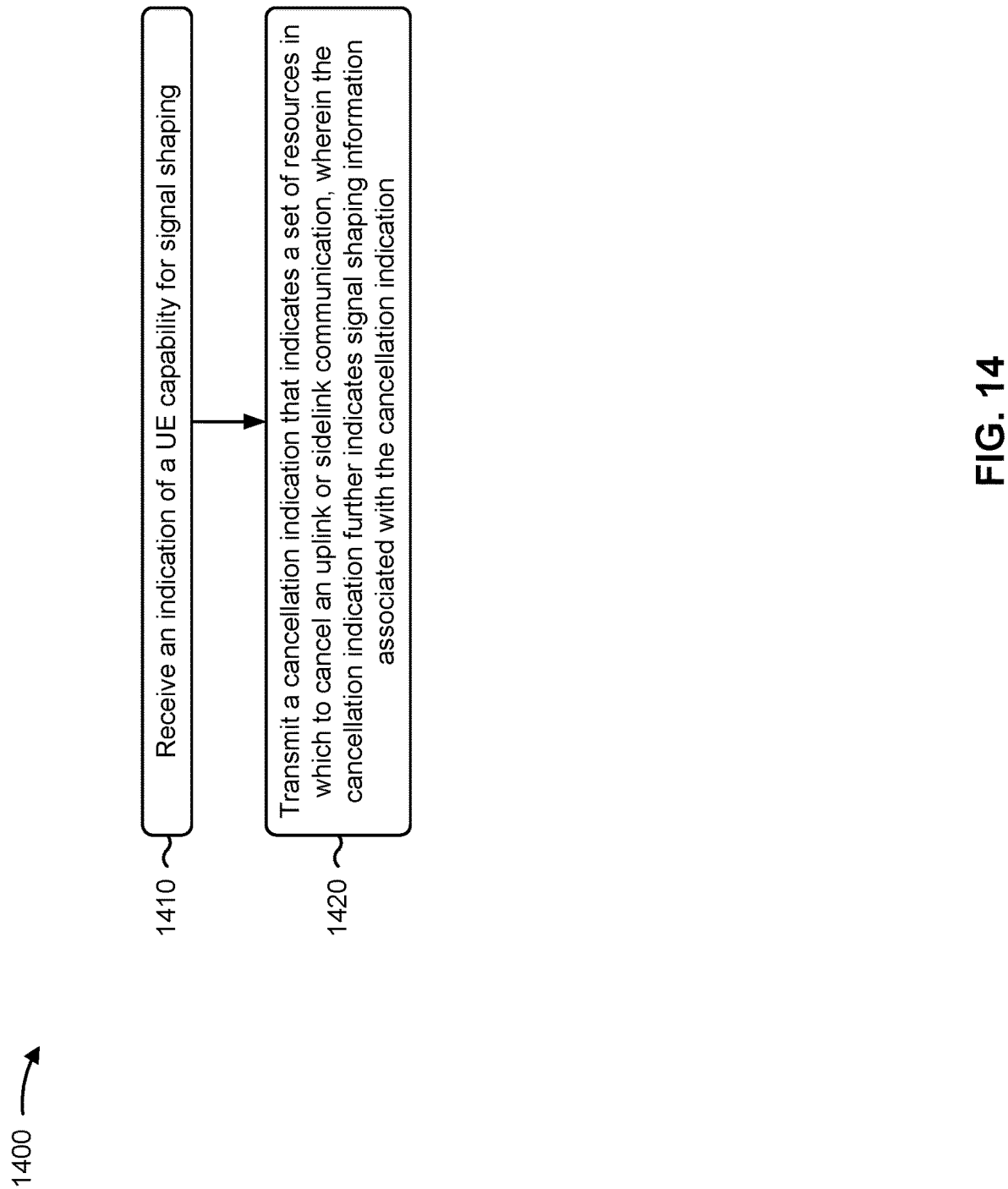

FIG. 14 is a diagram illustrating an example process 1400 performed, for example, by a base station, in accordance with the present disclosure. Example process 1400 is an example where the base station (e.g., base station 110) performs operations associated with signal shaping with canceled tones.

As shown in FIG. 14, in some aspects, process 1400 may include receiving, from a UE, an indication of a UE capability for signal shaping (block 1410). For example, the base station (e.g., using communication manager 150 and/or reception component 1602, depicted in FIG. 16) may receive, from a UE, an indication of a UE capability for signal shaping, as described above, for example, with reference to FIGS. 8, 9, 10, and/or 11.

As further shown in FIG. 14, in some aspects, process 1400 may include transmitting, to the UE, a cancellation indication that indicates a set of resources in which to cancel an uplink or sidelink communication, wherein the cancellation indication further indicates signal shaping information associated with the cancellation indication (block 1420). For example, the base station (e.g., using communication manager 150 and/or transmission component 1604, depicted in FIG. 16) may transmit, to the UE, a cancellation indication that indicates a set of resources in which to cancel an uplink or sidelink communication, wherein the cancellation indication further indicates signal shaping information associated with the cancellation indication, as described above, for example, with reference to FIGS. 8, 9, 10, and/or 11.

Process 1400 may include additional aspects, such as any single aspect or any combination of aspects described below and/or in connection with one or more other processes described elsewhere herein.

In a first aspect, the cancellation indication further indicates at least one of one more transmission power thresholds for cancellation subcarriers in a set of cancellation subcarriers, a number of the cancellation subcarriers in the set of cancellation subcarriers, positions of the cancellation subcarriers in the set of cancellation subcarriers, a protected frequency range, or a minimum interference suppression level for the protected frequency range.

In a second aspect, alone or in combination with the first aspect, the indication of the UE capability for signal shaping includes an indication of a UE capability for active interference cancellation.

In a third aspect, alone or in combination with one or more of the first and second aspects, the indication of the UE capability for active interference cancellation includes at least one of an indication of a maximum number of cancellation subcarriers for active interference cancellation, an indication of one or more supported active interference cancellation algorithms, or an indication of a computation time associated with active interference cancellation.

In a fourth aspect, alone or in combination with one or more of the first through third aspects, the cancellation indication is an uplink cancellation indication.

In a fifth aspect, alone or in combination with one or more of the first through fourth aspects, process 1400 includes receiving, from the UE, a combined signal including a cancellation signal, on a set of cancellation subcarriers, and a data signal on subcarriers other than subcarriers included in the set of resources indicated by the cancellation indication, discarding symbols associated with the cancellation signal received on the set of cancellation subcarriers, and decoding the data signal received on one or more subcarriers other than the set of cancellation subcarriers In a sixth aspect, alone or in combination with one or more of the first through fifth aspects, the cancellation indication is a sidelink cancellation indication.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
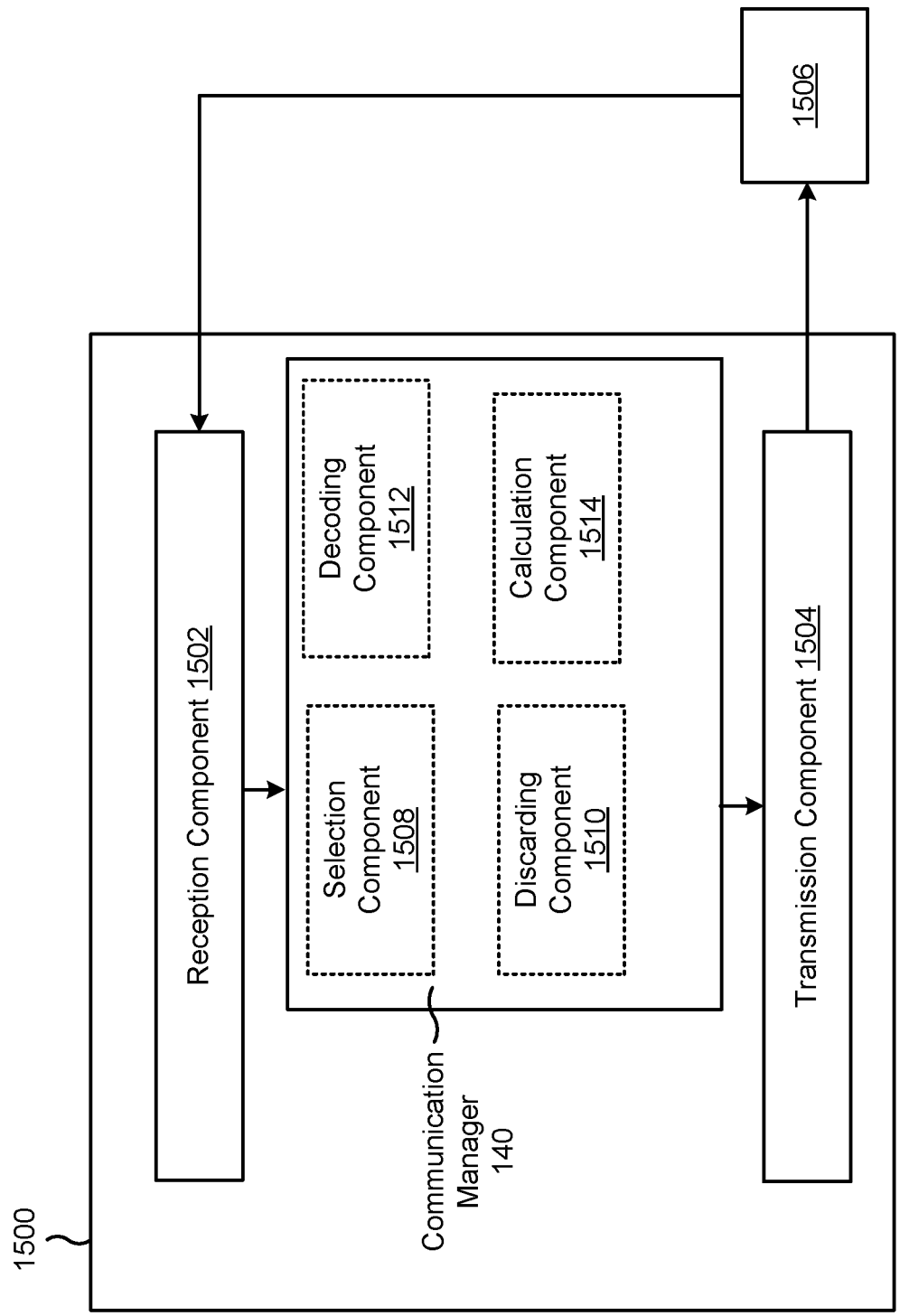
FIGS. 15-16 are diagrams of example apparatuses for wireless communication, in accordance with the present disclosure.

FIG. 15 is a diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include one or more of a selection component 1508, a discarding component 1510, a decoding component 1512, or a calculation component 1514, among other examples.

In some aspects, the apparatus 1500 may be configured to perform one or more operations described herein in connection with FIGS. 8-11. Additionally, or alternatively, the apparatus 1500 may be configured to perform one or more processes described herein, such as process 1200 of FIG. 12, process 13 of FIG. 13, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The reception component 1502 may receive a cancellation indication that indicates a set of resources in which to cancel an uplink or sidelink communication. The transmission component 1504 may transmit a combined signal including a data signal and a cancellation signal. The transmission component 1504, to transmit the combined signal, may transmit the data signal on one or more subcarriers other than subcarriers included in the set of resources indicated by the cancellation indication, and transmit the cancellation signal on a set of cancellation subcarriers for performing signal shaping of the data signal.

The selection component 1508 may select the set of cancellation subcarriers on which to transmit the cancellation signal to perform signal shaping of the data signal based at least in part on a protected frequency range or a protected time range associated with the set of resources indicated by the cancellation indication.

The reception component 1502 may receive an indication of the first transmission power threshold and the second transmission power threshold.

The calculation component 1514 may calculate symbols for the active interference cancellation signal on the set of cancellation subcarriers based at least in part on one or more transmission power thresholds associated with the set of cancellation subcarriers.

The transmission component 1504 may transmit, to a base station, an indication of a UE capability for active interference cancellation.

The transmission component 1504 may transmit, to the receiving UE, an indication of the set of cancellation subcarriers and a configuration of the cancellation signal.

The reception component 1502 may receive, from a first UE, a combined signal including a cancellation signal, on a set of cancellation subcarriers, and a data signal. The discarding component 1510 may discard symbols associated with the cancellation signal received on the set of cancellation subcarriers. The decoding component 1512 may decode the data signal received on one or more subcarriers other than the set of cancellation subcarriers.

The reception component 1502 may receive an indication of the set of cancellation subcarriers and a configuration of the cancellation signal.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
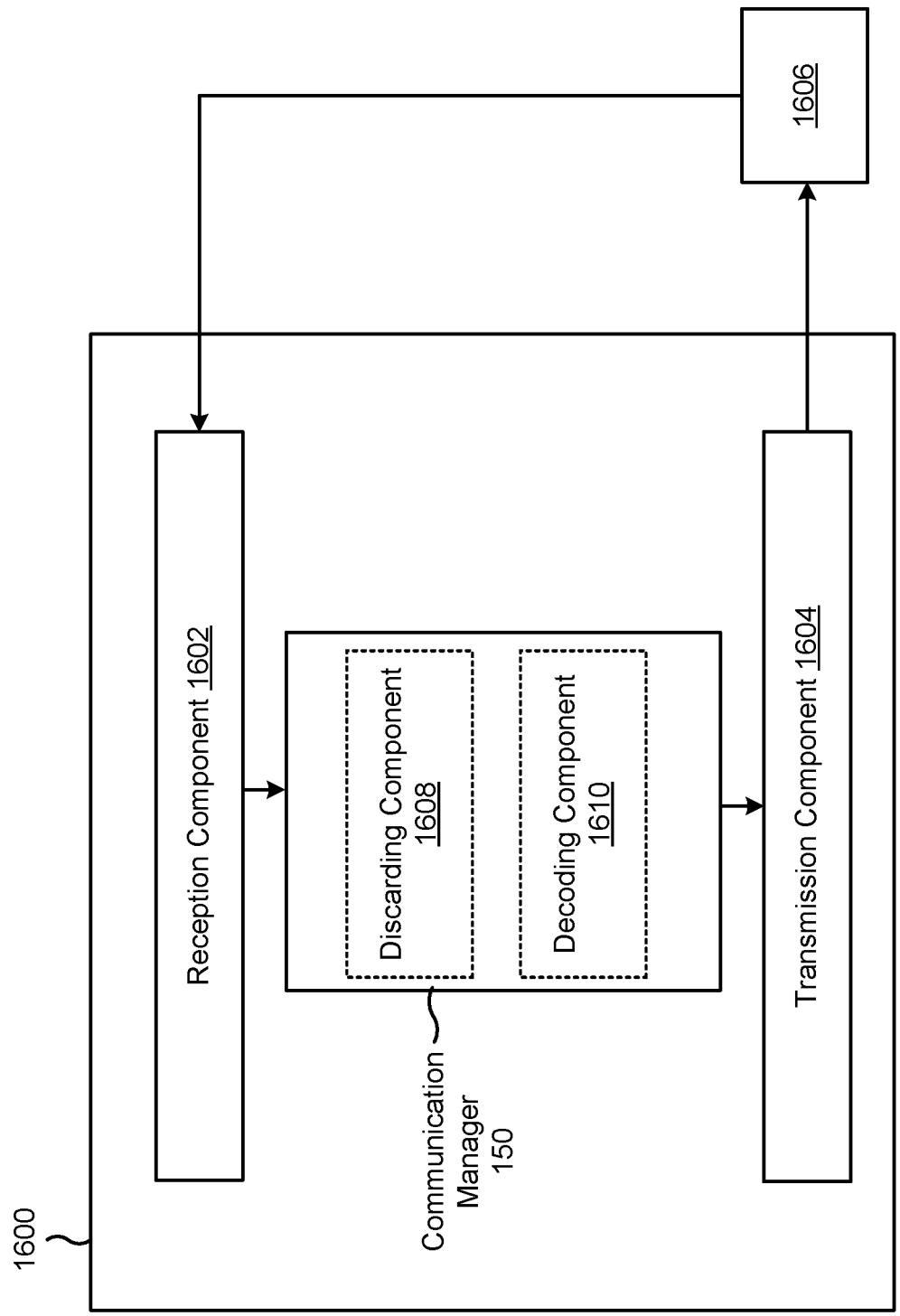

FIG. 16 is a diagram of an example apparatus 1600 for wireless communication. The apparatus 1600 may be a base station, or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include one or more of a discarding component 1608 or a decoding component 1610, among other examples.

In some aspects, the apparatus 1600 may be configured to perform one or more operations described herein in connection with FIGS. 8-11. Additionally, or alternatively, the apparatus 1600 may be configured to perform one or more processes described herein, such as process 1300 of FIG. 13, process 1400 of FIG. 14, or a combination thereof. In some aspects, the apparatus 1600 and/or one or more components shown in FIG. 16 may include one or more components of the base station described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the base station described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the base station described in connection with FIG. 2. In some aspects, the transmission component 1604 may be co-located with the reception component 1602 in a transceiver.

The reception component 1602 may receive, from a first UE, a combined signal including a cancellation signal, on a set of cancellation subcarriers, and a data signal. The discarding component 1608 may discard symbols associated with the cancellation signal received on the set of cancellation subcarriers. The decoding component 1610 may decode the data signal received on one or more subcarriers other than the set of cancellation subcarriers.

The transmission component 1604 may transmit, to the first UE, a cancellation indication that indicates a set of resources in which to cancel an uplink or sidelink communication, wherein receiving the combined signal comprises receiving the combined signal at a time resource indicated by the cancellation indication.

The reception component 1602 may receive, from the first UE, an indication of a UE capability for active interference cancellation.

The reception component 1602 may receive, from a UE, an indication of a UE capability for signal shaping. The transmission component 1604 may transmit, to the UE, a cancellation indication that indicates a set of resources in which to cancel an uplink or sidelink communication, wherein the cancellation indication further indicates signal shaping information associated with the cancellation indication.

The reception component 1602 may receive, from the UE, a combined signal including a cancellation signal, on a set of cancellation subcarriers, and a data signal on subcarriers other than subcarriers included in the set of resources indicated by the cancellation indication.

The discarding component 1608 may discard symbols associated with the cancellation signal received on the set of cancellation subcarriers.

The decoding component 1610 may decode the data signal received on one or more subcarriers other than the set of cancellation subcarriers.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: receiving a cancellation indication that indicates a set of resources in which to cancel an uplink or sidelink communication; and transmitting a combined signal including a data signal and a cancellation signal, wherein transmitting the combined signal comprises transmitting the data signal on one or more subcarriers other than subcarriers included in the set of resources indicated by the cancellation indication, and transmitting the cancellation signal on a set of cancellation subcarriers.

Aspect 2: The method of Aspect 1, further comprising: selecting a set of cancellation subcarriers on which to transmit a cancellation signal to perform signal shaping of a data signal based at least in part on a protected frequency range or a protected time range associated with the set of resources indicated by the cancellation indication.

Aspect 3: The method of any of Aspects 1-2, wherein the set of cancellation subcarriers includes one or more subcarriers in a protected frequency range, or wherein the set of cancellation subcarriers includes one or more subcarriers outside of the protected frequency range.

Aspect 4: The method of any of Aspects 1-3, wherein the set of cancellation subcarriers includes at least one of: one or more subcarriers within a protected frequency range and associated with a first transmission power threshold; or one or more subcarriers outside of the protected frequency range and associated with a second transmission power threshold.

Aspect 5: The method of Aspect 4, further comprising: receiving an indication of the first transmission power threshold and the second transmission power threshold.

Aspect 6: The method of any of Aspects 1-5, wherein the cancellation signal is an active interference cancellation signal to suppress leakage of the data signal to a protected frequency range from subcarriers outside of the protected frequency range.

Aspect 7: The method of Aspect 6, further comprising: calculating symbols for the active interference cancellation signal on the set of cancellation subcarriers based at least in part on one or more transmission power thresholds associated with the set of cancellation subcarriers.

Aspect 8: The method of Aspect 7, wherein transmitting the combined signal comprises: generating an orthogonal frequency division multiplexing (OFDM) waveform including the data signal and the active interference cancellation signal.

Aspect 9: The method of any of Aspects 6-8, further comprising: transmitting, to a base station, an indication of a UE capability for active interference cancellation.

Aspect 10: The method of Aspect 9, wherein the indication of the UE capability for active interference cancellation includes at least one of: an indication of a maximum number of cancellation subcarriers for active interference cancellation; an indication of one or more supported active interference cancellation algorithms; or an indication of a computation time associated with active interference cancellation.

Aspect 11: The method of any of Aspects 6-10, wherein the cancellation indication further indicates at least one of: one more transmission power thresholds for cancellation subcarriers in the set of cancellation subcarriers; a number of the cancellation subcarriers in the set of cancellation subcarriers; positions of the cancellation subcarriers in the set of cancellation subcarriers; the protected frequency range; or a minimum interference suppression level for the protected frequency range.

Aspect 12: The method of any of Aspects 1-11, wherein the cancellation signal is a signal modulated with the data signal on the set of cancellation subcarriers to reduce amplitude peaks of the data signal in a protected time range.

Aspect 13: The method of any of Aspects 1-12, wherein the cancellation indication is an uplink cancellation indication, wherein the data signal is an uplink data signal, and wherein transmitting the combined signal comprises: transmitting the combined signal, including the uplink data signal and the cancellation signal, to a base station.

Aspect 14: The method of any of Aspects 1-12, wherein the cancellation indication is a sidelink cancellation indication, wherein the data signal is a sidelink data signal, and wherein transmitting the combined signal comprises: transmitting the combined signal, including the sidelink data signal and the cancellation signal, to a receiving UE.

Aspect 15: The method of Aspect 14, further comprising: transmitting, to the receiving UE, an indication of the set of cancellation subcarriers and a configuration of the cancellation signal.

Aspect 16: A method of wireless communication performed by a wireless network device, comprising: receiving, from a first user equipment (UE), a combined signal including a cancellation signal, on a set of cancellation subcarriers, and a data signal; discarding symbols associated with the cancellation signal received on the set of cancellation subcarriers; and decoding the data signal received on one or more subcarriers other than the set of cancellation subcarriers.

Aspect 17: The method of Aspect 16, wherein the cancellation signal is an active interference cancellation signal to suppress leakage of the data signal to a protected frequency range from subcarriers outside of the protected frequency range.

Aspect 18: The method of any of Aspects 16-17, wherein the cancellation signal is a signal modulated with the data signal on the set of cancellation subcarriers to reduce amplitude peaks of the data signal in a protected time range.

Aspect 19: The method of any of Aspects 16-18, wherein the wireless network device is a base station.

Aspect 20: The method of Aspect 19, further comprising: transmitting, to the first UE, a cancellation indication that indicates a set of resources in which to cancel an uplink or sidelink communication, wherein receiving the combined signal comprises receiving the combined signal at a time resource indicated by the cancellation indication.

Aspect 21: The method of Aspect 20, wherein the cancellation indication further indicates at least one of: one more transmission power thresholds for cancellation subcarriers in the set of cancellation subcarriers; a number of the cancellation subcarriers in the set of cancellation subcarriers; positions of the cancellation subcarriers in the set of cancellation subcarriers; a protected frequency range; or a minimum interference suppression level for the protected frequency range.

Aspect 22: The method of any of Aspects 19-21, further comprising: receiving, from the first UE, an indication of a UE capability for active interference cancellation.

Aspect 23: The method of Aspect 22, wherein the indication of the UE capability for active interference cancellation includes at least one of: an indication of a maximum number of cancellation subcarriers for active interference cancellation; an indication of one or more supported active interference cancellation algorithms; or an indication of a computation time associated with active interference cancellation.

Aspect 24: The method of any of Aspects 16-18, wherein the wireless network device is a second UE.

Aspect 25: The method of Aspect 24, further comprising: receiving an indication of the set of cancellation subcarriers and a configuration of the cancellation signal.

Aspect 26: The method of Aspect 25, wherein receiving the indication of the set of cancellation subcarriers and the configuration of the cancellation signal comprises: receiving the indication of the set of cancellation subcarriers and the configuration of the cancellation signal from the first UE.

Aspect 27: The method of Aspect 25, wherein receiving the indication of the set of cancellation subcarriers and the configuration of the cancellation signal comprises: receiving the indication of the set of cancellation subcarriers and the configuration of the cancellation signal from a base station.

Aspect 28: A method of wireless communication performed by a base station, comprising: receiving, from a UE, an indication of a UE capability for signal shaping; and transmitting, to the UE, a cancellation indication that indicates a set of resources in which to cancel an uplink or sidelink communication, wherein the cancellation indication further indicates signal shaping information associated with the cancellation indication.

Aspect 29: The method of Aspect 28, wherein the cancellation indication further indicates at least one of: one more transmission power thresholds for cancellation subcarriers in a set of cancellation subcarriers; a number of the cancellation subcarriers in the set of cancellation subcarriers; positions of the cancellation subcarriers in the set of cancellation subcarriers; a protected frequency range; or a minimum interference suppression level for the protected frequency range.

Aspect 30: The method of any of Aspects 28-29, wherein the indication of the UE capability for signal shaping includes an indication of a UE capability for active interference cancellation.

Aspect 31: The method of Aspect 30, wherein the indication of the UE capability for active interference cancellation includes at least one of: an indication of a maximum number of cancellation subcarriers for active interference cancellation; an indication of one or more supported active interference cancellation algorithms; or an indication of a computation time associated with active interference cancellation.

Aspect 32: The method of any of Aspects 28-31, wherein the cancellation indication is an uplink cancellation indication.

Aspect 33: The method of Aspect 32, further comprising: receiving, from the UE, a combined signal including a cancellation signal, on a set of cancellation subcarriers, and a data signal on subcarriers other than subcarriers included in the set of resources indicated by the cancellation indication; discarding symbols associated with the cancellation signal received on the set of cancellation subcarriers; and decoding the data signal received on one or more subcarriers other than the set of cancellation subcarriers Aspect 34: The method of any of Aspects 28-31, wherein the cancellation indication is a sidelink cancellation indication.

Aspect 35: An apparatus for wireless communication at a device, comprising a processor; memory coupled with the processor; and instructions stored in the memory and executable by the processor to cause the apparatus to perform the method of one or more of Aspects 1-15.

Aspect 36: A device for wireless communication, comprising a memory and one or more processors coupled to the memory, the one or more processors configured to perform the method of one or more of Aspects 1-15.

Aspect 37: An apparatus for wireless communication, comprising at least one means for performing the method of one or more of Aspects 1-15.

Aspect 38: A non-transitory computer-readable medium storing code for wireless communication, the code comprising instructions executable by a processor to perform the method of one or more of Aspects 1-15.

Aspect 39: A non-transitory computer-readable medium storing a set of instructions for wireless communication, the set of instructions comprising one or more instructions that, when executed by one or more processors of a device, cause the device to perform the method of one or more of Aspects 1-15.

Aspect 40: An apparatus for wireless communication at a device, comprising a processor; memory coupled with the processor; and instructions stored in the memory and executable by the processor to cause the apparatus to perform the method of one or more of Aspects 16-27.

Aspect 41: A device for wireless communication, comprising a memory and one or more processors coupled to the memory, the one or more processors configured to perform the method of one or more of Aspects 16-27.

Aspect 42: An apparatus for wireless communication, comprising at least one means for performing the method of one or more of Aspects 16-27.

Aspect 43: A non-transitory computer-readable medium storing code for wireless communication, the code comprising instructions executable by a processor to perform the method of one or more of Aspects 16-27.

Aspect 44: A non-transitory computer-readable medium storing a set of instructions for wireless communication, the set of instructions comprising one or more instructions that, when executed by one or more processors of a device, cause the device to perform the method of one or more of Aspects 16-27.

Aspect 45: An apparatus for wireless communication at a device, comprising a processor; memory coupled with the processor; and instructions stored in the memory and executable by the processor to cause the apparatus to perform the method of one or more of Aspects 28-34.

Aspect 46: A device for wireless communication, comprising a memory and one or more processors coupled to the memory, the one or more processors configured to perform the method of one or more of Aspects 28-34.

Aspect 47: An apparatus for wireless communication, comprising at least one means for performing the method of one or more of Aspects 28-34.

Aspect 48: A non-transitory computer-readable medium storing code for wireless communication, the code comprising instructions executable by a processor to perform the method of one or more of Aspects 28-34.

Aspect 49: A non-transitory computer-readable medium storing a set of instructions for wireless communication, the set of instructions comprising one or more instructions that, when executed by one or more processors of a device, cause the device to perform the method of one or more of Aspects 28-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
 a memory; and
 one or more processors, coupled to the memory, configured to:
  receive a cancellation indication that indicates a set of resources in which to cancel an uplink or sidelink communication; and
  transmit a combined signal including a data signal and a cancellation signal, wherein the one or more processors, to transmit the combined signal, are configured to:
   transmit the data signal on one or more subcarriers other than subcarriers included in the set of resources indicated by the cancellation indication, and
   transmit the cancellation signal on a set of cancellation subcarriers for performing signal shaping of the data signal.

2. The UE of claim 1, wherein the one or more processors are further configured to:
 select the set of cancellation subcarriers on which to transmit the cancellation signal to perform signal shaping of the data signal based at least in part on a protected frequency range or a protected time range associated with the set of resources indicated by the cancellation indication.

3. The UE of claim 1, wherein the set of cancellation subcarriers includes one or more subcarriers in a protected frequency range, or wherein the set of cancellation subcarriers includes one or more subcarriers outside of the protected frequency range.

4. The UE of claim 1, wherein the set of cancellation subcarriers includes at least one of:
one or more subcarriers within a protected frequency range and associated with a first transmission power threshold; or
one or more subcarriers outside of the protected frequency range and associated with a second transmission power threshold.

5. The UE of claim 4, wherein the one or more processors are further configured to:
receive an indication of the first transmission power threshold and the second transmission power threshold.

6. The UE of claim 1, wherein the cancellation signal is an active interference cancellation signal to suppress leakage of the data signal to a protected frequency range from subcarriers outside of the protected frequency range.

7. The UE of claim 6, wherein the one or more processors are further configured to:
calculate symbols for the active interference cancellation signal on the set of cancellation subcarriers based at least in part on one or more transmission power thresholds associated with the set of cancellation subcarriers.

8. The UE of claim 7, wherein the one or more processors, to transmit the combined signal, are configured to:
generate an orthogonal frequency division multiplexing (OFDM) waveform including the data signal and the active interference cancellation signal.

9. The UE of claim 6, wherein the one or more processors are further configured to:
transmit, to a base station, an indication of a UE capability for active interference cancellation.

10. The UE of claim 9, wherein the indication of the UE capability for active interference cancellation includes at least one of:
an indication of a maximum number of cancellation subcarriers for active interference cancellation;
an indication of one or more supported active interference cancellation algorithms; or
an indication of a computation time associated with active interference cancellation.

11. The UE of claim 6, wherein the cancellation indication further indicates at least one of:
one more transmission power thresholds for cancellation subcarriers in the set of cancellation subcarriers;
a number of the cancellation subcarriers in the set of cancellation subcarriers;
positions of the cancellation subcarriers in the set of cancellation subcarriers;
the protected frequency range; or
a minimum interference suppression level for the protected frequency range.

12. The UE of claim 1, wherein the cancellation signal is a signal modulated with the data signal on the set of cancellation subcarriers to reduce amplitude peaks of the data signal in a protected time range.

13. The UE of claim 1, wherein the cancellation indication is an uplink cancellation indication, wherein the data signal is an uplink data signal, and wherein the one or more processors to transmit the combined signal are configured to:
transmit the combined signal, including the uplink data signal and the cancellation signal, to a base station.

14. The UE of claim 1, wherein the cancellation indication is a sidelink cancellation indication, wherein the data signal is a sidelink data signal, and wherein the one or more processors, to transmit the combined signal, are configured to:
transmit the combined signal, including the sidelink data signal and the cancellation signal, to a receiving UE.

15. The UE of claim 14, wherein the one or more processors are further configured to:
transmit, to the receiving UE, an indication of the set of cancellation subcarriers and a configuration of the cancellation signal.

16. A wireless network device for wireless communication, comprising:
a memory; and
one or more processors, coupled to the memory, configured to:
receive, from a first user equipment (UE), a combined signal including a cancellation signal, on a set of cancellation subcarriers, and a data signal;
discard symbols associated with the cancellation signal received on the set of cancellation subcarriers; and
decode the data signal received on one or more subcarriers other than the set of cancellation subcarriers.

17. The wireless network device of claim 16, wherein the cancellation signal is an active interference cancellation signal to suppress leakage of the data signal to a protected frequency range from subcarriers outside of the protected frequency range.

18. The wireless network device of claim 16, wherein the cancellation signal is a signal modulated with the data signal on the set of cancellation subcarriers to reduce amplitude peaks of the data signal in a protected time range.

19. The wireless network device of claim 16, wherein the wireless network device is a base station.

20. The wireless network device of claim 19, wherein the one or more processors are further configured to:
transmit, to the first UE, a cancellation indication that indicates a set of resources in which to cancel an uplink or sidelink communication, wherein receiving the combined signal comprises receiving the combined signal at a time resource indicated by the cancellation indication.

21. The wireless network device of claim 16, wherein the wireless network device is a second UE.

22. The wireless network device of claim 21, wherein the one or more processors are further configured to:
receive an indication of the set of cancellation subcarriers and a configuration of the cancellation signal.

23. The wireless network device of claim 22, wherein the one or more processors, to receive the indication of the set of cancellation subcarriers and the configuration of the cancellation signal, are configured to:
receive the indication of the set of cancellation subcarriers and the configuration of the cancellation signal from the first UE.

24. The wireless network device of claim 22, wherein the one or more processors, to receive the indication of the set of cancellation subcarriers and the configuration of the cancellation signal, are configured to:
receive the indication of the set of cancellation subcarriers and the configuration of the cancellation signal from a base station.

25. A method of wireless communication performed by a user equipment (UE), comprising:
- receiving a cancellation indication that indicates a set of resources in which to cancel an uplink or sidelink communication; and
- transmitting a combined signal including a data signal and a cancellation signal, wherein transmitting the combined signal comprises:
  - transmitting the data signal on one or more subcarriers other than subcarriers included in the set of resources indicated by the cancellation indication, and
  - transmitting the cancellation signal on a set of cancellation subcarriers for performing signal shaping of the data signal.

26. The method of claim 25, wherein the set of cancellation subcarriers includes at least one of:
- one or more subcarriers within a protected frequency range and associated with a first transmission power threshold; or
- one or more subcarriers outside of the protected frequency range and associated with a second transmission power threshold.

27. The method of claim 25, wherein the cancellation signal is an active interference cancellation signal to suppress leakage of the data signal to a protected frequency range from subcarriers outside of the protected frequency range.

28. The method of claim 27, further comprising:
- calculating symbols for the active interference cancellation signal on the set of cancellation subcarriers based at least in part on one or more transmission power thresholds associated with the set of cancellation subcarriers.

29. The method of claim 25, wherein the cancellation signal is a signal modulated with the data signal on the set of cancellation subcarriers to reduce amplitude peaks of the data signal in a protected time range.

30. A method of wireless communication performed by a wireless network device, comprising:
- receiving, from a first user equipment (UE), a combined signal including a cancellation signal, on a set of cancellation subcarriers, and a data signal;
- discarding symbols associated with the cancellation signal received on the set of cancellation subcarriers; and
- decoding the data signal received on one or more subcarriers other than the set of cancellation subcarriers.

* * * * *